(12) United States Patent
Collins, Jr.

(10) Patent No.: US 10,446,058 B2
(45) Date of Patent: Oct. 15, 2019

(54) TACTILE PIN ACTUATOR

(71) Applicant: Blind Instruments, LLC, Whitehouse Station, NJ (US)

(72) Inventor: James Carstairs Collins, Jr., Whitehouse Station, NJ (US)

(73) Assignee: Blind Instruments, LLC, Whitehouse Station, NJ (US)

( * ) Notice: Subject to any disclaimer, the term of this patent is extended or adjusted under 35 U.S.C. 154(b) by 192 days.

(21) Appl. No.: 15/601,263

(22) Filed: May 22, 2017

(65) Prior Publication Data

US 2017/0345337 A1 Nov. 30, 2017

Related U.S. Application Data

(60) Provisional application No. 62/340,695, filed on May 24, 2016.

(51) Int. Cl.
  *G09B 21/00* (2006.01)
  *G06F 3/01* (2006.01)

(52) U.S. Cl.
  CPC .......... *G09B 21/004* (2013.01); *G06F 3/016* (2013.01); *G09B 21/003* (2013.01)

(58) Field of Classification Search
  USPC ........... 434/112–115, 117; 340/407.1, 407.2; 400/109.1
  See application file for complete search history.

(56) References Cited

U.S. PATENT DOCUMENTS

| | | | |
|---|---|---|---|
| 2,891,324 A * | 6/1959 | Zuk ...................... | G09B 21/003 434/114 |
| 3,293,925 A | 12/1966 | Linsley | |
| 4,871,992 A | 10/1989 | Petersen | |
| 5,453,012 A * | 9/1995 | Hudecek .............. | G09B 21/003 434/114 |
| 5,717,423 A | 2/1998 | Parker | |
| 5,772,440 A * | 6/1998 | Ida ....................... | G09B 21/004 340/407.1 |
| 6,705,868 B1 * | 3/2004 | Schleppenbach .... | G09B 21/004 434/112 |

(Continued)

FOREIGN PATENT DOCUMENTS

JP   HEI 81996-76684    3/1996

*Primary Examiner* — Kurt Fernstrom
(74) *Attorney, Agent, or Firm* — Condo Roccia Koptiw LLP

(57) ABSTRACT

A tactile pin actuator comprises a tactile pin assembly that includes a tactile pin and a recess that has a first screw thread formed thereon. A stop assembly is rigidly coupled relative to the tactile pin actuator. A lead screw attached to a shaft is positioned in the recess and is mechanically engaged with the first screw thread. A projection extends axially from the shaft. Rotation of the shaft in a first rotational direction relative to the tactile pin assembly causes the tactile pin assembly to move linearly in a first linear direction away from the shaft. Rotation of the shaft in the first rotational direction ceases when the projection comes into contact with the stop assembly. Rotation of the shaft in a second rotational direction causes the tactile pin assembly to move linearly in a second direction toward the shaft. Rotation of the shaft in the second direction ceases when the projection comes into contact with the stop assembly.

20 Claims, 28 Drawing Sheets

(56) References Cited

U.S. PATENT DOCUMENTS

| | | | |
|---|---|---|---|
| 6,734,785 B2* | 5/2004 | Petersen | G09B 21/004 |
| | | | 340/4.12 |
| 6,827,512 B1 | 12/2004 | Souluer | |
| 7,009,595 B2 | 3/2006 | Roberts et al. | |
| 7,497,687 B2* | 3/2009 | Shin | G09B 21/004 |
| | | | 434/113 |
| 9,812,033 B2* | 11/2017 | Chari | G09B 21/004 |
| 10,083,628 B2* | 9/2018 | Yip | G09B 21/004 |
| 10,127,832 B2* | 11/2018 | Moon | G09B 21/004 |
| 2010/0159423 A1* | 6/2010 | Hashizume | G06F 3/016 |
| | | | 434/114 |
| 2014/0242555 A1 | 8/2014 | Murphy et al. | |
| 2014/0255880 A1 | 9/2014 | Chari | |
| 2015/0125831 A1 | 5/2015 | Chandrashekhar Nair et al. | |
| 2015/0206453 A1 | 7/2015 | Yip | |

* cited by examiner

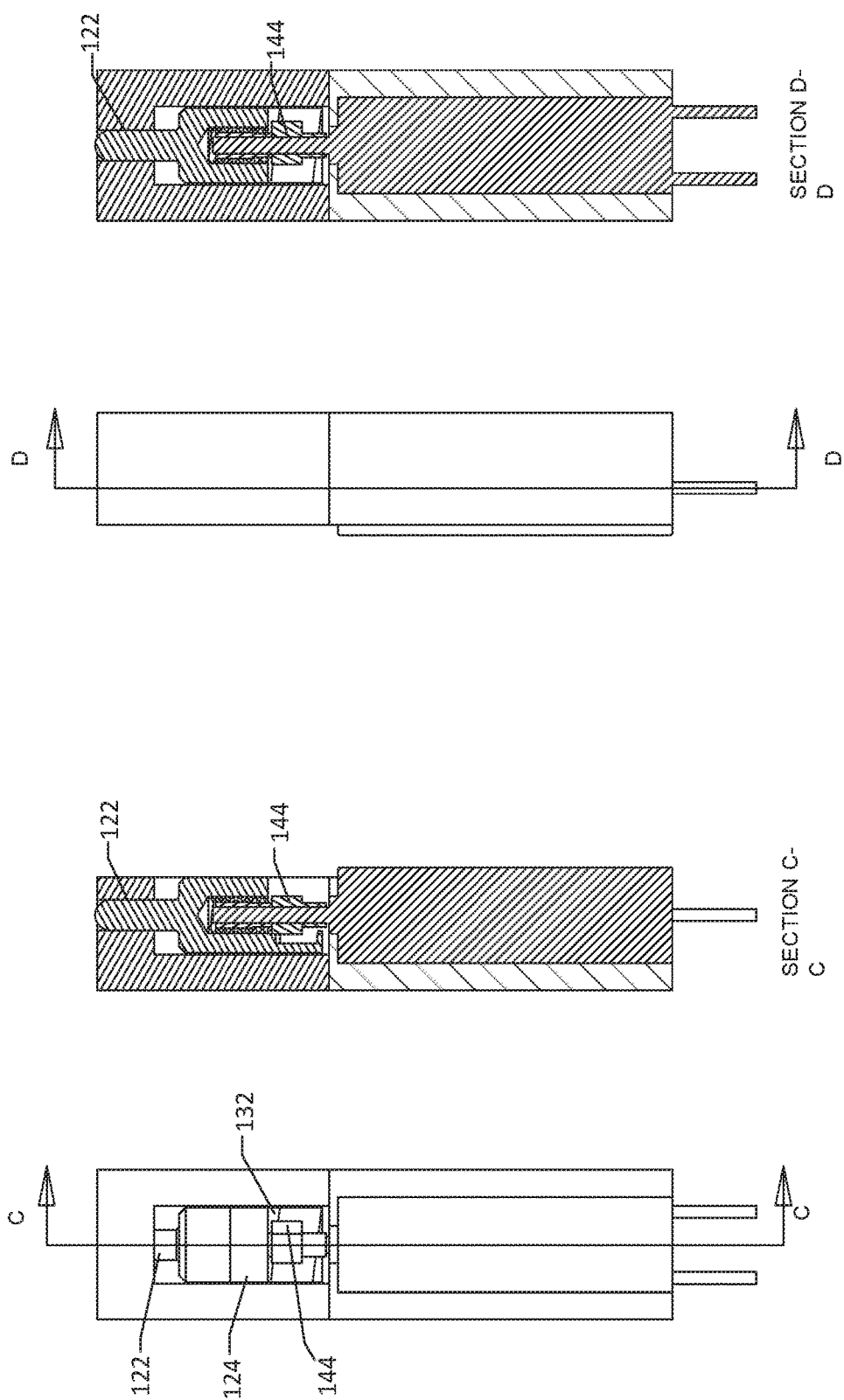

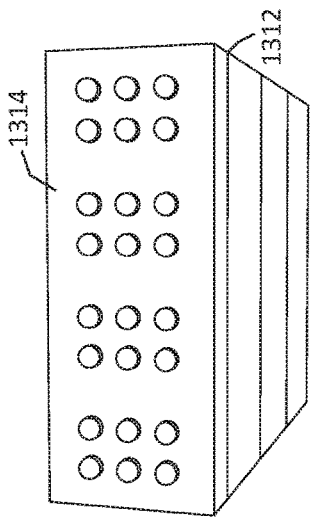
FIG. 13C
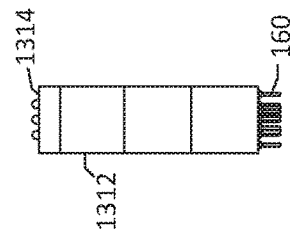
FIG. 13F
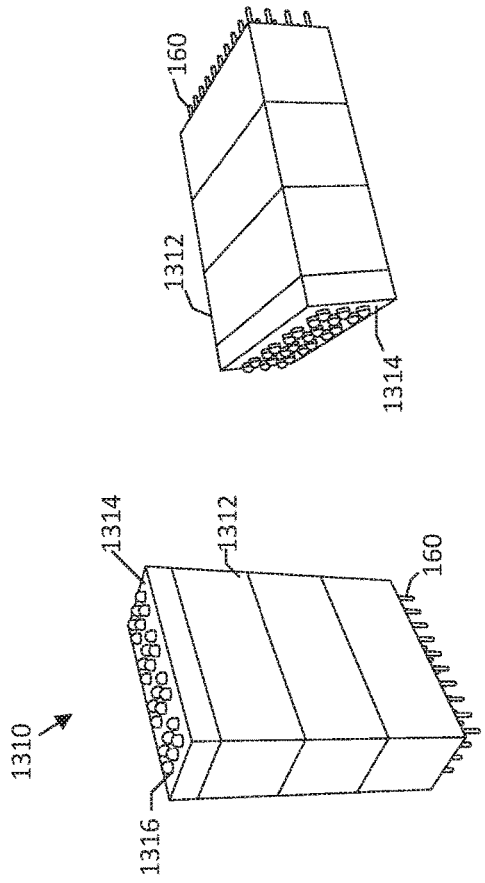
FIG. 13B
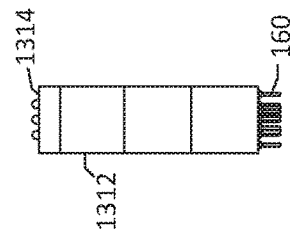
FIG. 13E
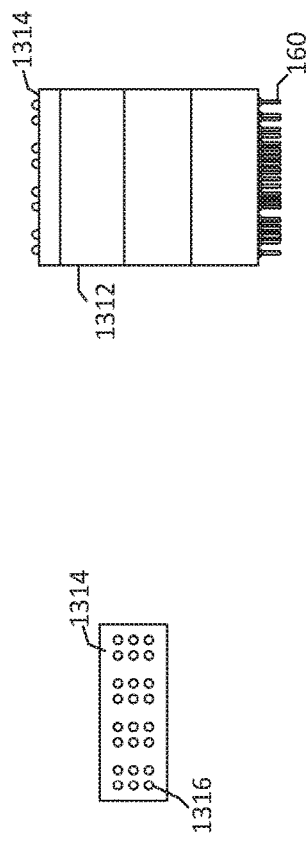
FIG. 13A
FIG. 13D

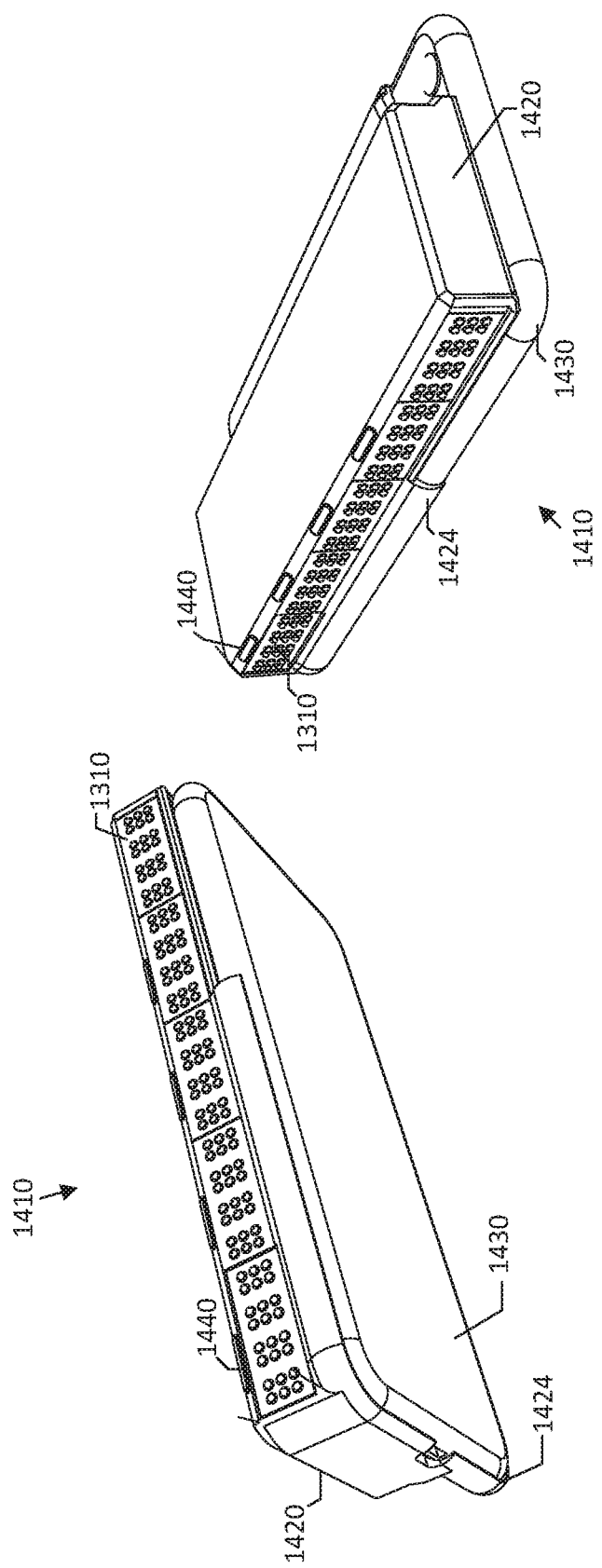

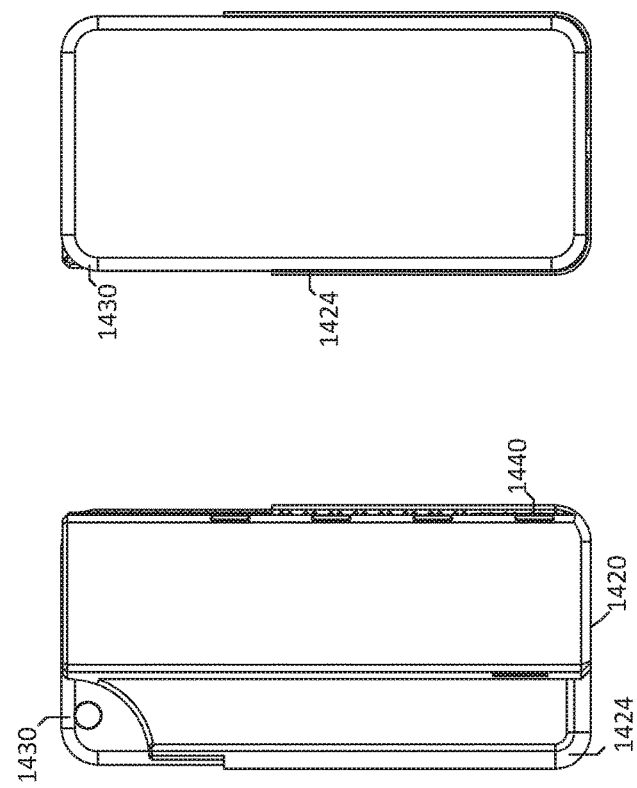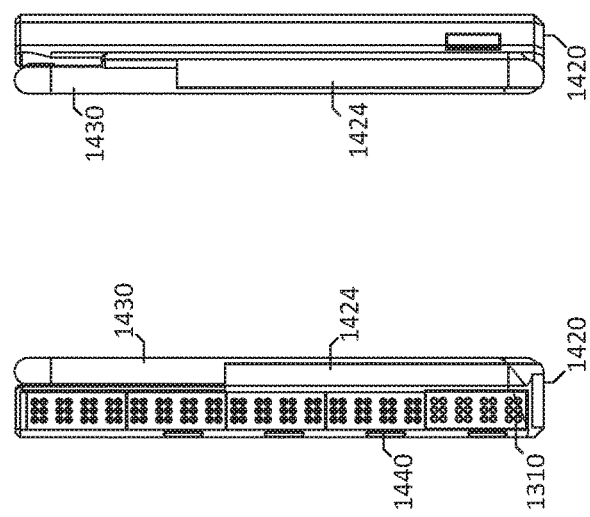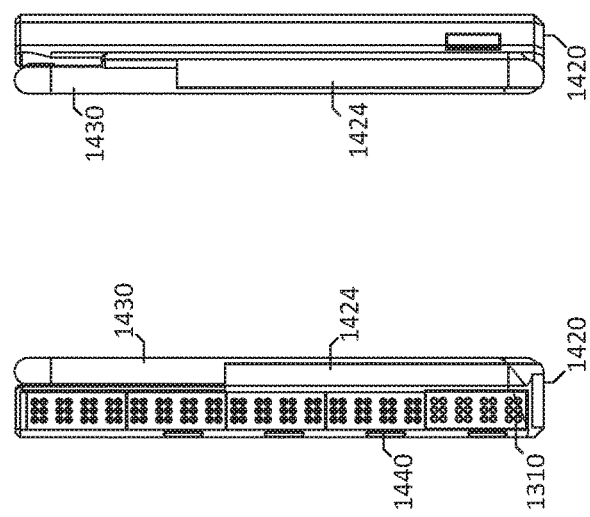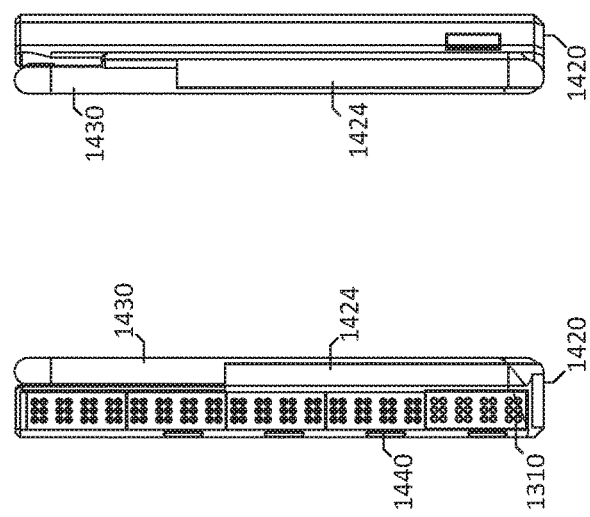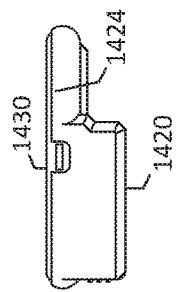

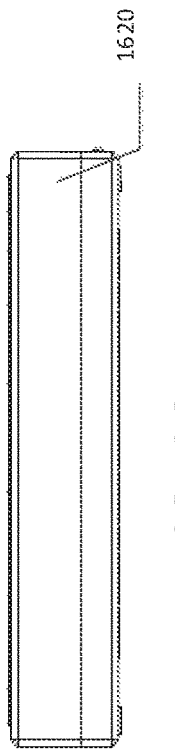
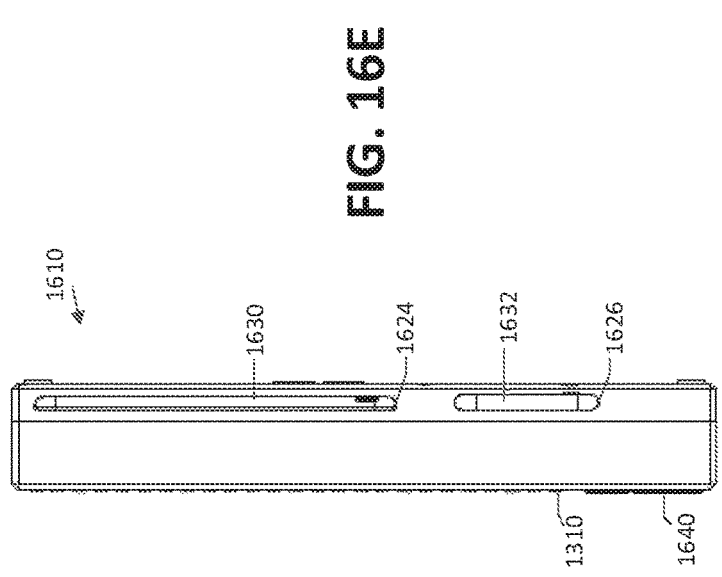
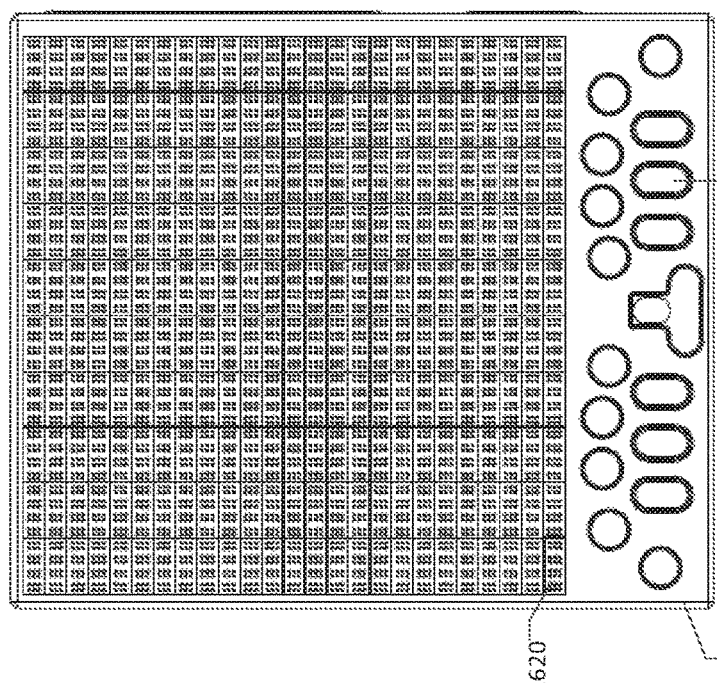
FIG. 16D
FIG. 16E
FIG. 16C

TACTILE PIN ACTUATOR

CROSS REFERENCE TO RELATED APPLICATIONS

This application claims the benefit of U.S. Provisional Application No. 62/340,695, filed May 24, 2016, and titled Tactile Pin Actuator, the contents of which are hereby incorporated herein by reference in their entirety.

BACKGROUND

Braille is a writing system that employs combinations of raised dots to identify characters in a written alphabet. The raised dots are arranged into cells. The number and arrangement of the raised dots in a cell identify a particular character. In most versions of braille, each cell may contain up to six dots, although other versions employ more dots per cell.

Traditionally, braille characters have been formed by embossing raised dots on a medium such as paper. The advance of technology has allowed for the creation of electromechanical systems that are adapted to create refreshable braille displays. Refreshable braille displays consist of electromechanical character cells each of which can raise or lower a combination of six rounded-tip dots. In many instances, the mechanism by which the dots are raised and lowered relies upon the piezo-electric effect of expanding and reducing a crystal. In a typical design, a crystal is mechanically connected to a pin such that expansion of the crystal causes the pin to rise and thereby be exposed as a dot in a representation of a braille character. Removing a voltage from a crystal causes the crystal to return to its normal state and size and thereby cause the corresponding pin to be withdrawn.

SUMMARY

Applicant discloses herein improved systems for actuating tactile pins. In an example system, rotation of a shaft in a first direction causes a tactile pin to extend from a surface, with the rotation of the shaft in the first direction being limited by a projection coming into contact with a first surface. Rotation of a shaft in a second direction causes the tactile pin to be withdrawn relative to the surface, with the rotation of the shaft in the second direction being limited by the projection coming into contact with a second surface. A plurality of the improved systems for actuating tactile pins may be packaged together into pin actuator modules comprising a plurality of retractable tactile pins configured to represent braille cells. The pin actuator modules may be aligned in an array to form a braille display.

In a typical refreshable braille display where a single braille cell representing a single character contains six dots, the display must have the capability to independently raise and withdraw each of six pins in each cell. Existing systems that rely upon piezo-electric expansion and reduction of crystals employ a separate crystal to raise each pin in a braille cell. As a result, even a single refreshable braille cell of six potential braille dots is technically complex and expensive to manufacture. At least in part due to the expense associated with refreshable braille cells, existing refreshable braille displays typically contain only a relatively small number of refreshable cells.

Applicant discloses herein improved systems for actuating tactile pins. An example tactile pin actuator system comprises a tactile pin assembly that includes a tactile pin and a recess. The recess has a first screw thread formed thereon. A stop assembly, which operates to limit the degree of movement of the tactile pin assembly, is secured relative to the tactile pin assembly and comprises a first surface, a second surface, and a recess formed between.

The system further comprises a shaft having at least a portion with a second screw thread formed thereon. A portion of the shaft is positioned in the recess and the second screw thread is mechanically engaged with the first screw thread. A projection, which may be, for example, a cam, extends axially from the shaft and is secured relative to the shaft. Rotation of the shaft in a first rotational direction relative to the tactile pin assembly causes the tactile pin assembly to move linearly in a first linear direction away from the shaft. More particularly, the second screw thread formed on the shaft interfaces with the first screw thread in the recess of the tactile pin assembly such that rotation of the staff in the first rotational direction causes the second screw thread to exert a force on the first screw thread and, thereby, on the tactile pin assembly. The applied force causes the tactile pin assembly to move linearly away from the shaft. Rotation of the shaft in the first rotational direction is limited by, and ceases when the projection extending from the shaft comes into contact with the first surface of the stop assembly.

Rotation of the shaft in a second rotational direction relative to the tactile pin assembly causes the tactile pin assembly to move linearly in a second direction toward the shaft. More particularly, the second screw thread formed on the shaft interfaces with the first screw thread in the recess of the tactile pin assembly such that rotation of the staff in the second rotational direction causes the second screw thread to exert a force on the first screw thread and, thereby, on the tactile pin assembly. The force causes the tactile pin assembly to move linearly toward the shaft. Rotation of the shaft in the second direction is limited by, and ceases when the projection comes into contact with the second surface of the stop assembly. In an example embodiment, as the shaft rotates and the projection moves from being in contact with one of the first surface of the stop assembly and the second surface of the stop assembly, the recess in the stop assembly aligns with the projection and the projection is able to move through the recess on its path to the other of the first and second surface.

In an example embodiment, the tactile pin assembly is positioned in a vault of a housing. The tactile pin assembly forms a mechanical fit with the vault that allows the tactile pin assembly to move linearly within the vault in response to rotation by the shaft. The mechanical fit between tactile pin assembly and the vault prevents the tactile pin assembly from rotating with the shaft. Rather, the rotational motion of the shaft, by operation of the second screw thread imposing a force on the first screw thread, causes the tactile pin assembly to move linearly within the vault.

In an example embodiment, the housing has an aperture formed therein that is aligned with the tactile pin. Rotation of the shaft in the first rotational direction relative to the tactile pin assembly causes the tactile pin assembly to move linearly away from the shaft so that at least a portion of the tactile pin extends through the aperture and beyond an external surface of the housing. Rotation of the shaft in the second rotational direction relative to the tactile pin assembly causes the tactile pin assembly to move linearly toward the shaft such that the tactile pin becomes positioned below the external surface of the housing.

According to another aspect of the disclosed embodiments, a plurality of tactile pin actuator systems are packaged together into a tactile pin module. The tactile pin actuators are positioned relative to each other so that the retractable tactile pins are positioned to represent one or more braille cells. In an example embodiment, a module comprises a plurality of tactile pin actuator systems that are arranged side-by-side in a 3 by 2 array or matrix. The tactile pin module comprises an external surface with a plurality of apertures formed therein. In an example embodiment, the apertures are formed in a 3 by 2 array, with each tactile pin module aligned with one of the apertures. The individual tactile pin actuators may be operated to cause the corresponding tactile pin to extend beyond the external surface and to be withdrawn below the external surface. A module may comprise any suitable number of tactile pin actuators in order to form a desired number of refreshable braille cells. In an example embodiment, a module comprises twenty four actuator systems which are arranged in four side-by-side 3 by 2 arrays so as to represent four braille cells.

According to another aspect of the disclosed embodiments, a plurality of actuator modules may be positioned relative to each other so as to form a braille display system. In an example embodiment, a body has a recess formed therein. The recess is shaped so as to accommodate a plurality of tactile pin modules. The modules are arranged side by side so as to form an elongated array of refreshable braille cells. The display system may further comprise a computing device such as, for example, a mobile phone or tablet computer, which is communicatively coupled to the plurality of braille modules and the individual pin actuators comprised in the modules. The computing device is programmed to communicate signals to the pin actuators so as to raise and lower tactile pins in order to form braille characters on the external surface of the modules. In an example embodiment, the braille display body comprises a retainer for forming a mechanical fit with the computing device. For example, the braille display body may comprise a recess adapted to form a mechanical fit with the computing device.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The following description of the illustrative embodiments may be better understood when read in conjunction with the appended drawings. It is understood that potential embodiments of the disclosed systems and methods are not limited to those depicted.

FIGS. 12A and 12B depict side views and corresponding sectional views of an example pin actuator system.

FIGS. 13A, 13B, and 13C depict perspective views of an example tactile pin actuator module.

FIGS. 13D, 13E, and 13F depict a top view, a side view, and a side view, respectively, of an example tactile pin actuator module.

FIGS. 14B and 14C depict an example braille display.

FIGS. 14D, 14E, 14F, 14G, 14H, and 14I depict a top view, a bottom view, a side view, a side view, a side view and a side view, respectively, of an example braille display.

FIGS. 16C, 16D, and 16E depict a top view, a side view, and a side view of an example braille display.

DETAILED DESCRIPTION OF ILLUSTRATIVE EMBODIMENTS

In a typical refreshable braille display where a single braille cell representing a single character contains six dots, the display must have the capability to independently raise and withdraw each of six pins in each cell. Systems that rely upon piezo-electric expansion and reduction of crystals employ a separate crystal to raise each pin in a braille cell. As a result, even a single refreshable braille cell of six potential braille dots is technically complex and expensive to manufacture.

Applicant discloses improved systems for actuating tactile pins. An example tactile pin actuator system comprises a tactile pin assembly that includes a tactile pin and a recess that has a first screw thread formed thereon. A stop assembly is rigidly coupled relative to the tactile pin actuator and comprises a first surface, a second surface, and a recess formed. The actuator still further includes a shaft having at least a portion with a second screw thread formed thereon. At least a portion of the shaft is positioned in the recess and the second screw thread is mechanically engaged with the first screw thread. A projection, which may be, for example, a cam, extends axially from the shaft and is secured relative to the shaft. Rotation of the shaft in a first rotational direction relative to the tactile pin assembly causes the tactile pin assembly to move linearly in a first linear direction away from the shaft. Rotation of the shaft in the first rotational direction is limited by, and ceases when the projection comes into contact with the first surface of the stop assembly. Rotation of the shaft in a second rotational direction relative to the tactile pin assembly causes the tactile pin assembly to move linearly in a second direction toward the shaft. Rotation of the shaft in the second direction is limited by, and ceases when the projection comes into contact with the second surface of the stop assembly.

Figure 1A:
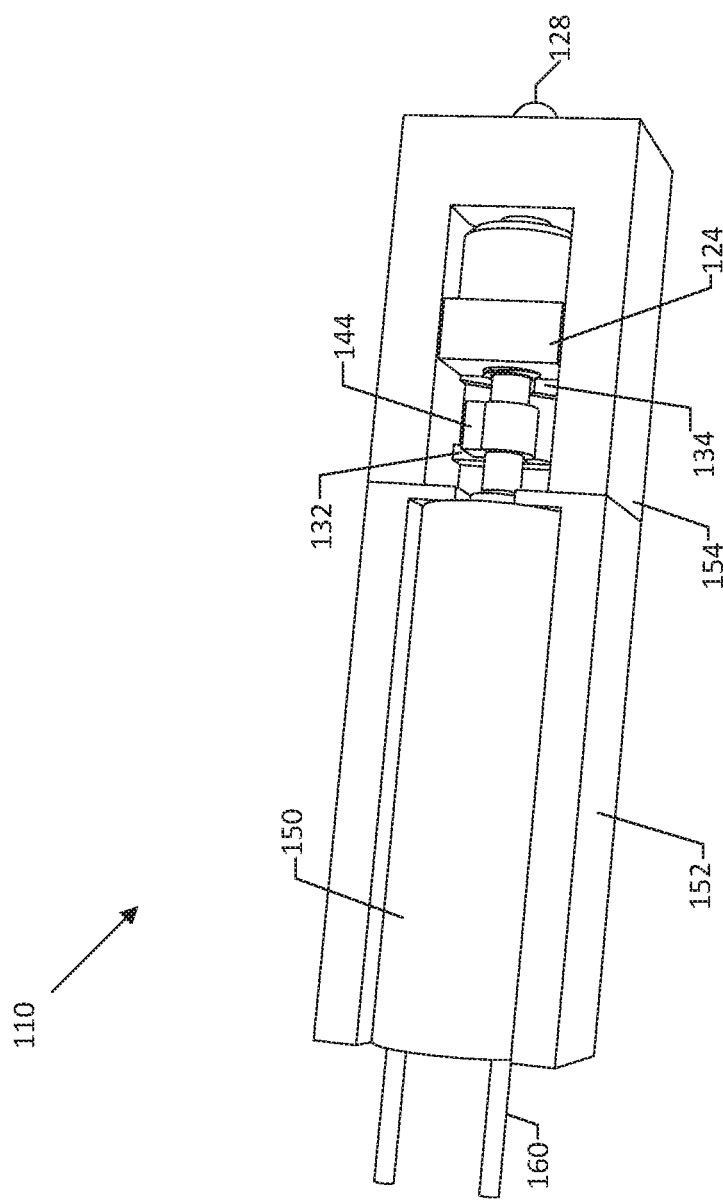
FIG. 1A depicts a perspective view of an example tactile pin actuator system.
Figure 1B:
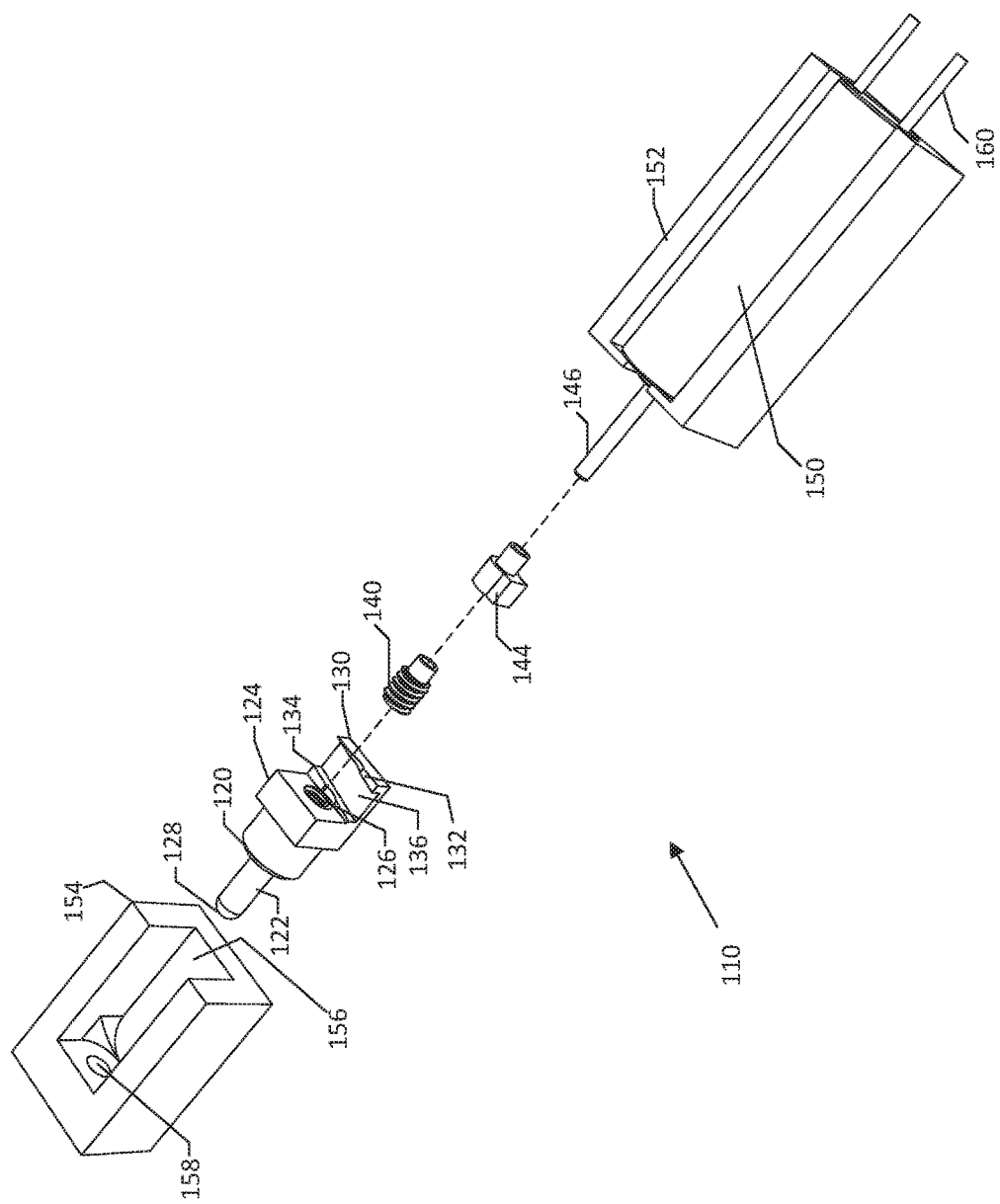
FIG. 1B depicts an exploded perspective view of an example tactile pin actuator system.
Figure 2B:
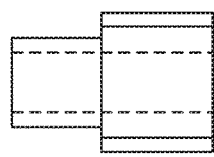
FIGS. 2A, 2B, 2C, and 2D depict a perspective view, a top view, a side view, and a rear side view, respectively, of an example projection.
Figure 2D:
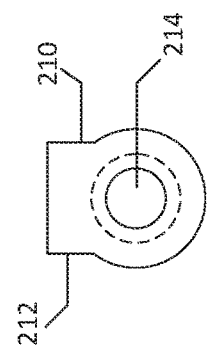
Figure 2A:
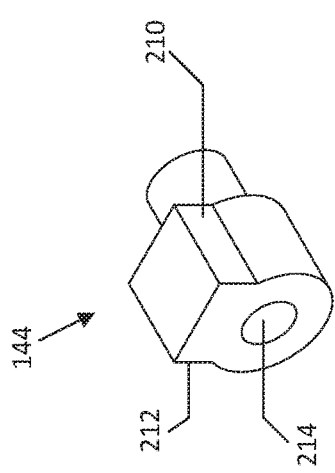
Figure 2C:
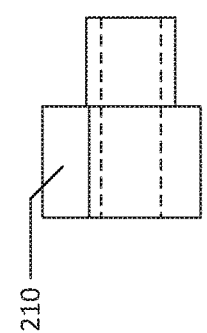
Figure 3B:
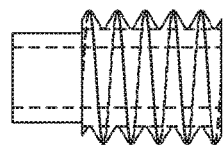
FIGS. 3A, 3B, 3C, and 3D depict a perspective view, a top view, a side view, and a side view, respectively, of an example lead screw.
Figure 3D:
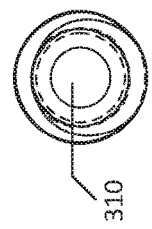
Figure 3A:
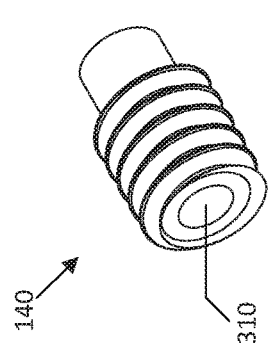
Figure 3C:
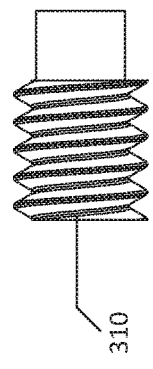
Figure 4B:
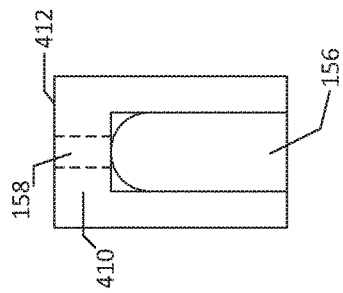
FIGS. 4A, 4B, 4C, and 4D depict a perspective view, a top view, a side view, and a side view, respectively, of an example tactile pin housing.
Figure 4D:
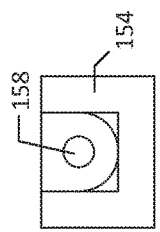
Figure 4A:
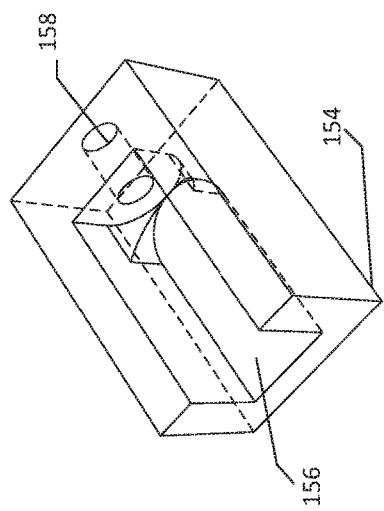
Figure 4C:
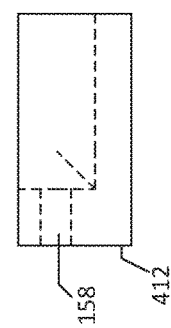
Figure 5B:
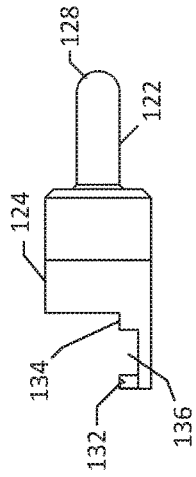
FIGS. 5A, 5B, 5C, and 5D depict a perspective view, a side view, a top view, and a rear side view, respectively, of an example tactile pin assembly and rigidly coupled stop assembly.
Figure 5D:
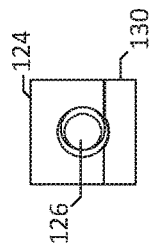
Figure 5A:
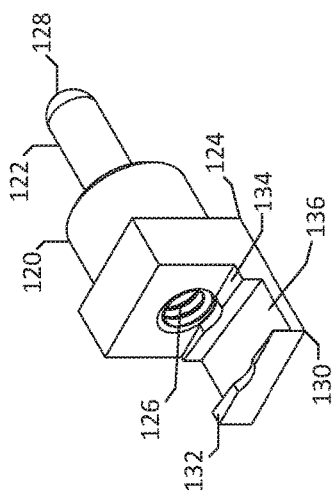
Figure 5C:
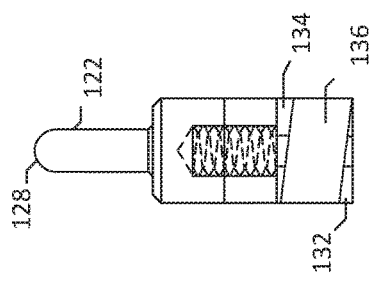

FIG. 1A provides a perspective view of an example tactile pin actuator system 110. FIG. 1B provides an exploded view of the example tactile pin actuator system 110. As shown, tactile pin actuator 110 comprises tactile pin assembly 120. Tactile pin assembly 120 comprises tactile pin 122 that extends from base 124. In an example embodiment, tactile pin 122 has an elongated shape with a rounded tip 128, and base 124 has a rectangular or square shape. Recess 126 is formed in base 124 and extends into tactile pin 122. Recess 124 has a first screw thread formed thereon that is adapted to receive a second screw thread as explained below.

Tactile pin actuator 110 further comprises stop assembly 130 which is shaped and positioned to stop the rotation of a shaft and thereby stop the lateral movement of tactile pin assembly 120. In an example embodiment, stop assembly 130 is secured relative to the tactile pin assembly 120 so that movement of the tactile pin assembly 120 results in movement of stop assembly 130. In the example embodiment depicted in FIGS. 1A and 1B, stop assembly 130 is integrally formed with the tactile pin assembly 120. Stop assembly 130 comprises a first surface 132, a second surface 134, and a recess or gap 136 formed there between.

Tactile pin actuator 110 further comprises lead screw 140. Lead screw 140 has a second screw thread formed thereon which is adapted to mechanically interface with the first screw thread formed on the surface of recess 126.

Tactile pin actuator 110 further comprises projection 144. In an example embodiment, projection 144 is shaped as a cam. Both projection 144 and lead screw 140 are secured relative to shaft 146. In an example embodiment, projection 144 and lead screw 140 are arranged axially relative to the shaft. Lead screw 140 may be secured to a distal end of shaft 146 and projection 144 extends from shaft 146. Rotation of shaft 146 results in rotation of lead screw 140 and projection 144.

Shaft 146 is coupled to motor 150. Motor is adapted to turn shaft 146 and thereby turn lead screw 140 and projection 144. Motor 150 may be any motor system suitable to drive shaft 146. In an example embodiment, motor 150 is a coreless motor. Motor 150 is positioned in motor mount 152 which may have any suitable configuration adapted to contain motor 152 and interface with components of the actuator system 110. Motor mount 152 is adapted to maintain the lateral position of motor 150 and attached shaft 146 relative to housing 154. As a result of motor 150 and shaft having a fixed lateral position relative to mount 152 and housing 154, the rotation of the shaft 146 by operation of motor 150 causes a lateral force to be applied to pin assembly 120. Motor 150 has electrical leads 160 extending therefrom with which motor 150 receives electrical current for controlling motor 150.

Tactile pin assembly 120 is positioned in housing 154. Housing 154 comprises a recess or vault 156 in which tactile pin assembly 120 is situated. Rounded end 128 of tactile pin 122 is aligned with an aperture or opening 158 formed in external side of housing 154. Base 124 of tactile pin assembly 120 forms a mechanical fit with the internal walls of housing 154 forming vault 156. The mechanical fit between base 124 and the internal walls of housing 154 prevent pin assembly 120 from rotating within vault 156. However, tactile pin assembly 120 has freedom of movement to move laterally within vault 156 so that end 128 of pin 122 may be extended through aperture 158 and above an external surface of housing 154.

Lateral movement of tactile pin assembly 120 in housing 154 results from rotation of shaft 146. Rotation of shaft 146 by motor 150 in a first rotational direction results in lead screw 140, which is attached to shaft 146, turning in the first rotational direction as well. The second screw thread disposed on lead screw 140 mechanically engages the first screw thread disposed on recess 126. Rotation of shaft 146 in the first rotational direction causes the second screw thread disposed on lead screw 140 to exert a force on the first screw thread disposed on recess 126 and, thereby, on tactile pin assembly 120. The force exerted on tactile pin assembly 120 results in the assembly moving linearly away from shaft 146 in vault 156. Rotation of shaft 146 in the first rotational direction is limited by, and ceases when projection 144, which is secured relative to shaft 136 and rotates with shaft 146, comes into contact with first surface 132 of stop assembly 132.

Rotation of shaft 146 in a second rotational direction relative to the tactile pin assembly 120 causes tactile pin assembly 120 to move linearly in a second direction toward shaft 146. More particularly, the second screw thread disposed on lead screw 140 interfaces with the first screw thread formed on recess 126 such that rotation of staff 146 and lead screw 140 in the second rotational direction causes the second screw thread to exert a force on the first screw thread disposed on recess 126 and, thereby, on the tactile pin assembly 120. The force exerted on tactile pin assembly 120 results in the assembly moving linearly in vault 156 toward shaft 146. Rotation of shaft 146 in the second direction is limited by, and ceases when projection 144 comes into contact with second surface 134 of stop assembly 130.

FIGS. 2A, 2B, 2C, and 2D provide a perspective view, a top view, a side view, and a rear side view, respectively, of projection 144. As shown, in an example embodiment, projection 144 is shaped as a cam that extends from the axis of projection 144. Projection 144 has a hole 214 running there through which is sized to allow projection 144 to be attached around and secured to shaft 146. Opposing sides 210 and 212 of projection 144 interface with first surface 132 and second surface 134 of stop assembly 130.

FIGS. 3A, 3B, 3C, and 3D provide a perspective view, a top view, and a two side views, respectively, of lead screw 140. As shown, in example embodiment, lead screw 140 has a hole or recess 310 formed therein sized and shaped to allow lead screw 140 to be attached and secured to shaft 146. Lead screw 140 has a screw thread formed thereon. The screw thread interfaces with a corresponding screw thread on recess 126. In an example embodiment, the screw threads may be 0-80 screw size, although any suitable type and size may be employed. Rotation of lead screw 140 causes the threads thereon to mechanically engage the threads in recess 126 and thereby apply a force on tactile pin assembly 120. The force on tactile pin assembly 120 causes tactile pin assembly 120 to move laterally away from or toward the shaft 146 depending upon the directional rotation of the shaft.

FIGS. 4A, 4B, 4C, and 4D provide a perspective view, a top views, and two side views, respectively, of housing 154. As shown, housing 154 comprises several walls which form a vault 156 in which tactile pin assembly 120 resides. A top external wall 410 has aperture 158 formed therein that extends from the vault 156 to external surface 412. An end of tactile pin 122 is received in aperture 158 and, depending upon the rotation of shaft 146, is either extended above external surface 412 or is withdrawn below surface of 412.

FIGS. 5A, 5B, 5C, and 5D provide a perspective view, a side view, and a top view, and a side view, respectively, of tactile pin assembly 120 with rigidly attached stop assembly 130. As shown, tactile pin assembly 120 comprises an elongated tactile pin 122 with a rounded distal end 128 that serves as a braille dot when the tactile pin 122 extends from aperture 158 in housing 154. Tactile pin assembly 120 comprises a body portion or base 124 that is shaped to move laterally within vault 156, but to prevent rotation relative to housing 154. In an example embodiment, the body has a generally rectangular shape that generally corresponds to the shape of vault 156 so that rotation is prevented. Recess 126 is formed in base 124 and extends into tactile pin 122. Recess 126 has a first screw thread formed thereon which is sized and shaped to mechanically interface with a second screw thread formed on lead screw 140.

Stop assembly 130 is configured to stop the rotation of shaft 146 and thereby stop the lateral movement of tactile pin assembly 120 in vault 156. In an example embodiment, stop assembly 130 comprises a first surface 132 and a second surface 134 with a recess 136 disposed in between. In the scenario wherein shaft 146 rotates in a first rotational direction, projection 144 similarly rotates until projection 144 comes into contact with first surface 132 at which point shaft 146 ceases rotation. Corresponding lateral movement of pin assembly 120 likewise stops. In the scenario wherein shaft 146 rotates in the opposite direction, projection 144 rotates with shaft 146 and passes through recess 136 which becomes positioned to coincide with projection 144 as stop assembly 130 and tactile pin assembly 120 move in response to force applied by lead screw 140 on pin assembly 120. Continued rotation of the shaft and projection 144 results in projection 144 coming into contact with the second surface 134 of stop assembly 130, at which point shaft 146 ceases rotation. Corresponding lateral movement of pin assembly 120 likewise stops.

Figure 6:
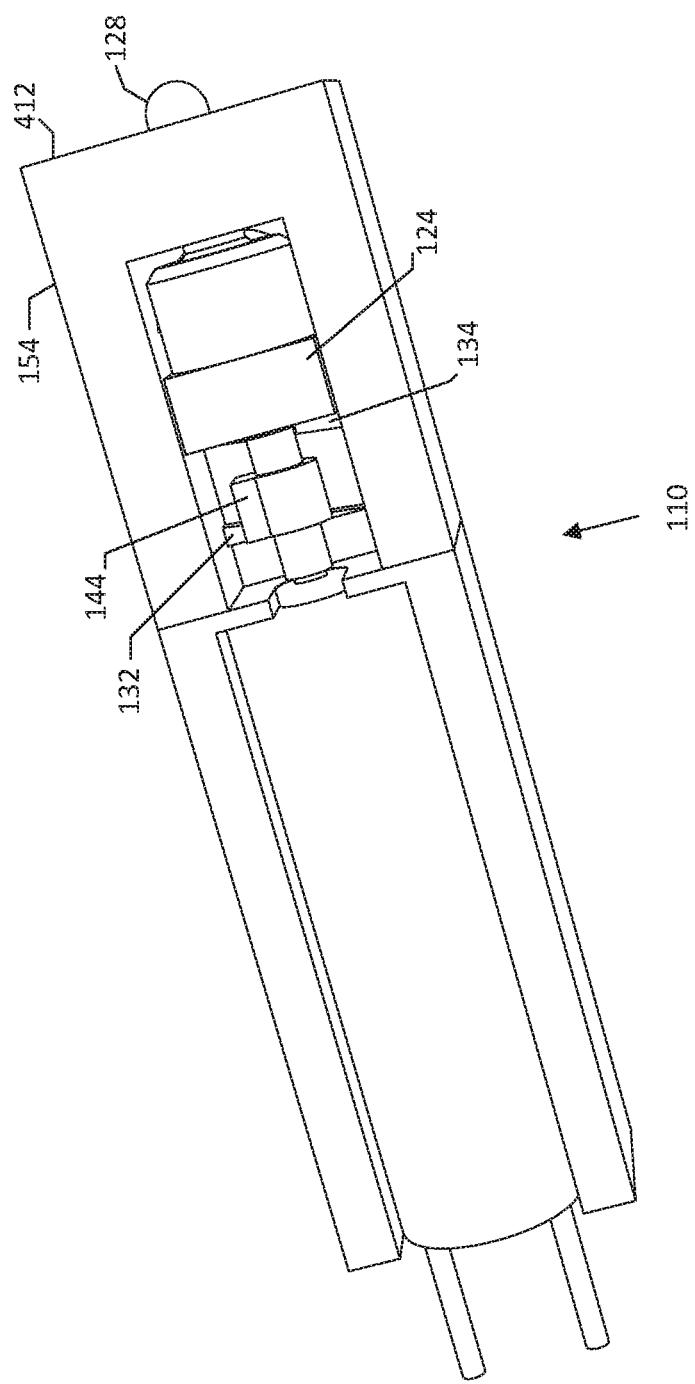
FIG. 6 depicts a perspective view of an example tactile pin actuator system.
Figure 7:
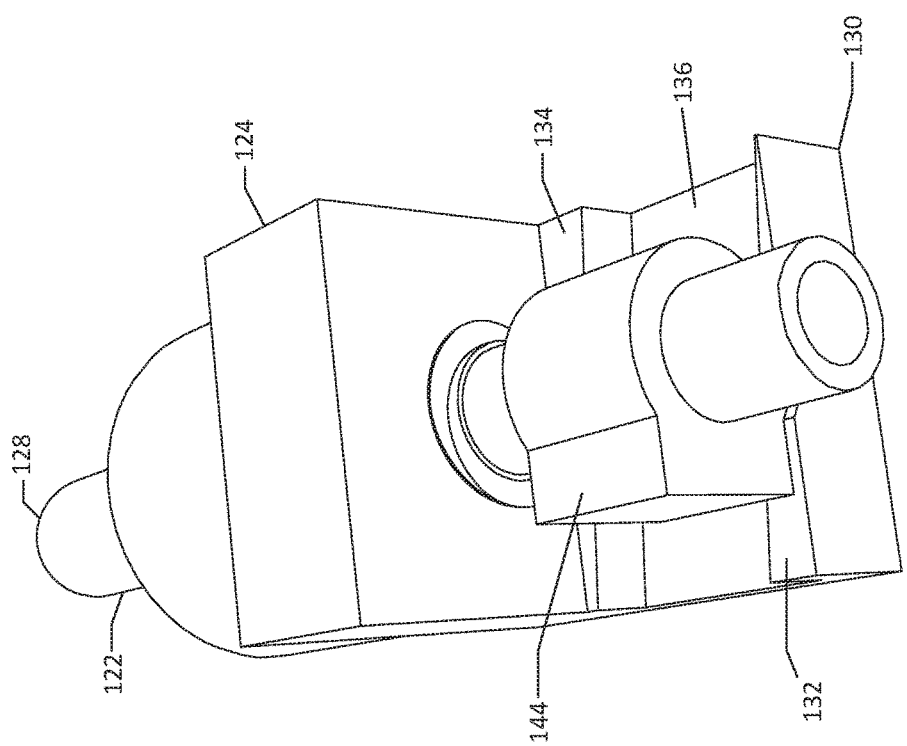
FIG. 7 depicts a perspective view of an example tactile pin assembly and attached stop assembly.

FIG. 6 provides a perspective view of pin actuator system 110 wherein shaft 146 has been rotated so that projection 144 has come into contact with first surface 132 of stop assembly 130. In the illustrated scenario, when shaft 146 has been rotated to the extent that projection 144 has been stopped at surface 132, the rounded end 128 of pin 122 extends from external surface 412 of housing 154 and thereby forms a raised braille dot. FIG. 7 provides an isolated perspective view of projection 144 relative to stop assembly 130. As shown, a first side of projection 144 has come into contact with or abutted first surface 132 of stop assembly 130 and thereby prevented further rotation of shaft 146.

Figure 8:
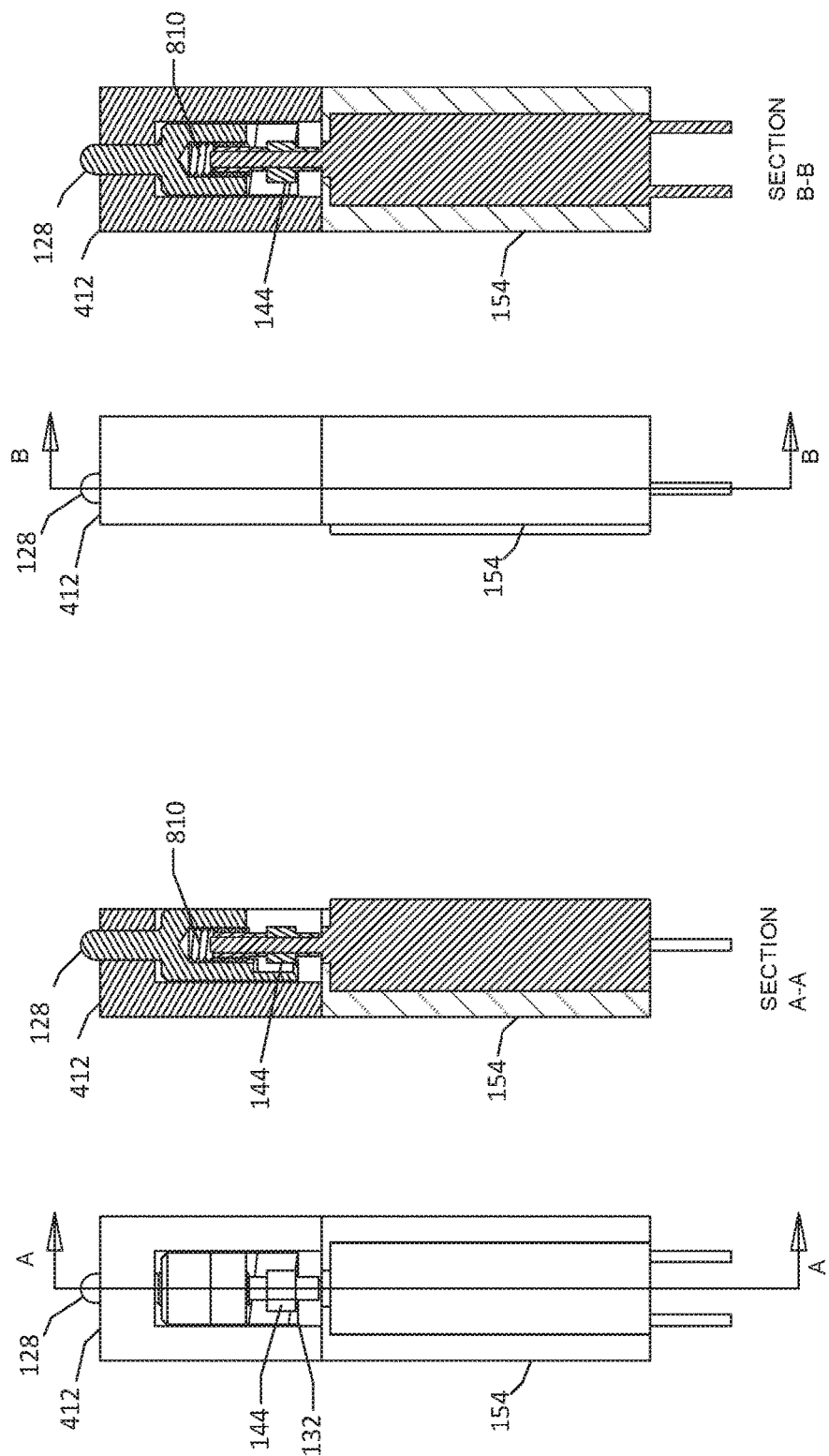
FIGS. 8A and 8B depict side views and corresponding sectional views of an example pin actuator system.

FIGS. 8A and 8B provide side views and corresponding sectional views of pin actuator systems 110 positioned as shown in FIGS. 6 and 7. FIG. 8A provides a side view of pin actuator system 110 wherein shaft 146 has been rotated to an extent that projection 144 has abutted first surface 132 of stop assembly 130. As shown, rounded end 128 of pin 122 extends from external surface 412 of housing 154. FIG. 8A provides a sectional view taken along section line A-A. As shown, in the scenario wherein shaft 146 has been rotated to the extent that projection 144 has abutted first surface 132 of stop assembly 130, tactile pin assembly 120 has moved laterally in vault 156 away from the lead screw 140 attached to shaft 146. Accordingly, a gap 810 is formed between lead screw 140 and the end of shaft 146 and the bottom of recess 126. FIG. 8B provides a side view of the pin actuator system 110 from another perspective along with a sectional view taken along section line B-B. FIG. 8B similarly illustrates end 128 of pin 122 extending from external surface 412 of housing 154, as well as gap 810 formed between lead screw 140 and a bottom or end of recess 126.

Withdrawing the distal end 128 from extending beyond external surface 412 involves rotating shaft 146 in a direction opposite to that which resulted in projection 144 abutting first surface 132. As shaft 146 rotates in this second direction, the screw threads located on lead screw 140 mechanically engage the screw threads on recess 126 and thereby apply a lateral force on pin assembly 120 that forces or causes pin assembly 120 to move toward shaft 146. Accordingly, as shaft 146 rotates, pin assembly 120 moves laterally within vault 156 toward shaft 146.

Figure 9:
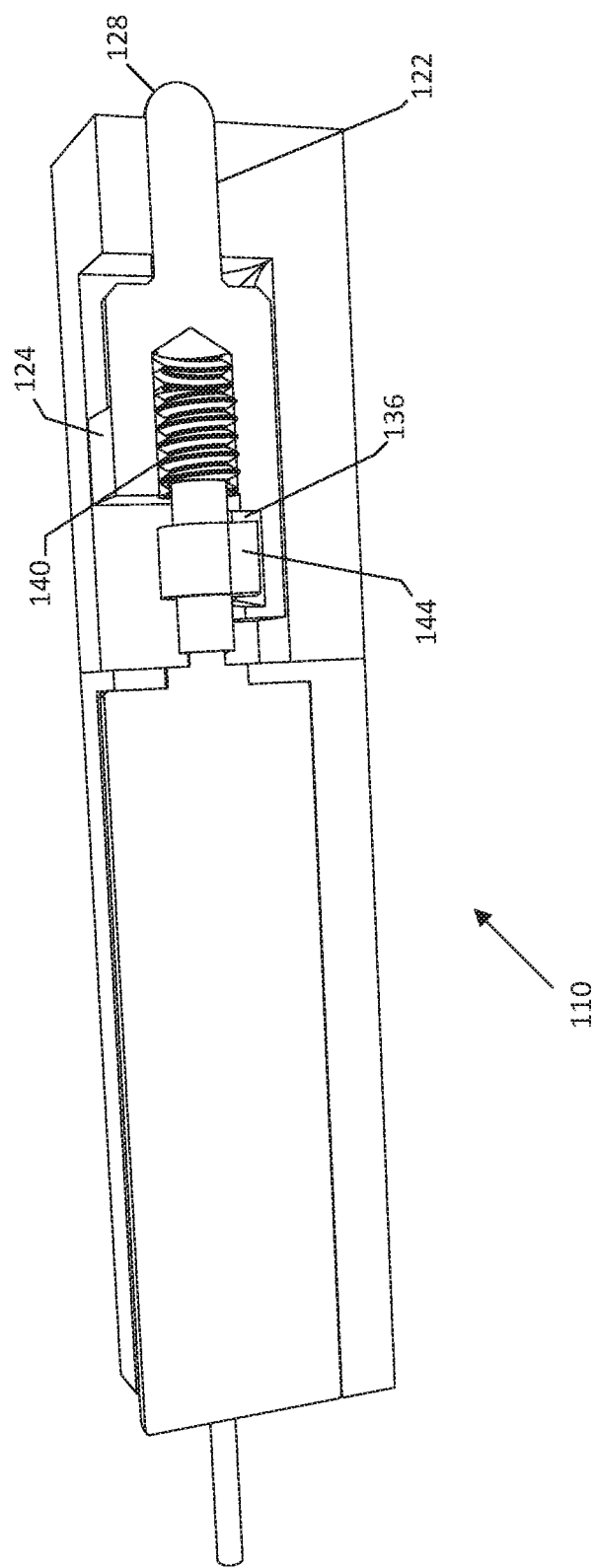
FIG. 9 depicts an example tactile pin actuator system shown partially in section.

Stop assembly 130 is rigidly coupled to pin assembly 120. Accordingly, as pin assembly 120 moves laterally, stop assembly 130 likewise moves laterally within shaft 156. Recess or gap 136 formed in stop assembly 130 is positioned and sized so that, as projection 144 rotates with shaft 146, projection 144 passes through recess 136. FIG. 9 depicts pin actuator system 110, shown partially in section, in a scenario where projection 144 is positioned in recess 136 during the travel of projection 144 between surfaces 132 and 134. Projection 144 extends from shaft 146 at an appropriate location, and the threads on recess 126 and lead screw 140 have an appropriate pitch, such that recess 136 aligns with projection 144 during the travel of projection 144 around axis of shaft 146. In the example embodiment, recess 136 is formed by two diagonally positioned sides so that as projection 144 passes through recess 136, the recess accommodates the movement of stop assembly 130 as it moves toward (or away) from shaft 146. Stated differently, recess 136 is formed at an angle relative to the axis of shaft 146 so as to accommodate movement of the stop assembly 130 while projection 144 moves through recess 136.

Figure 10:
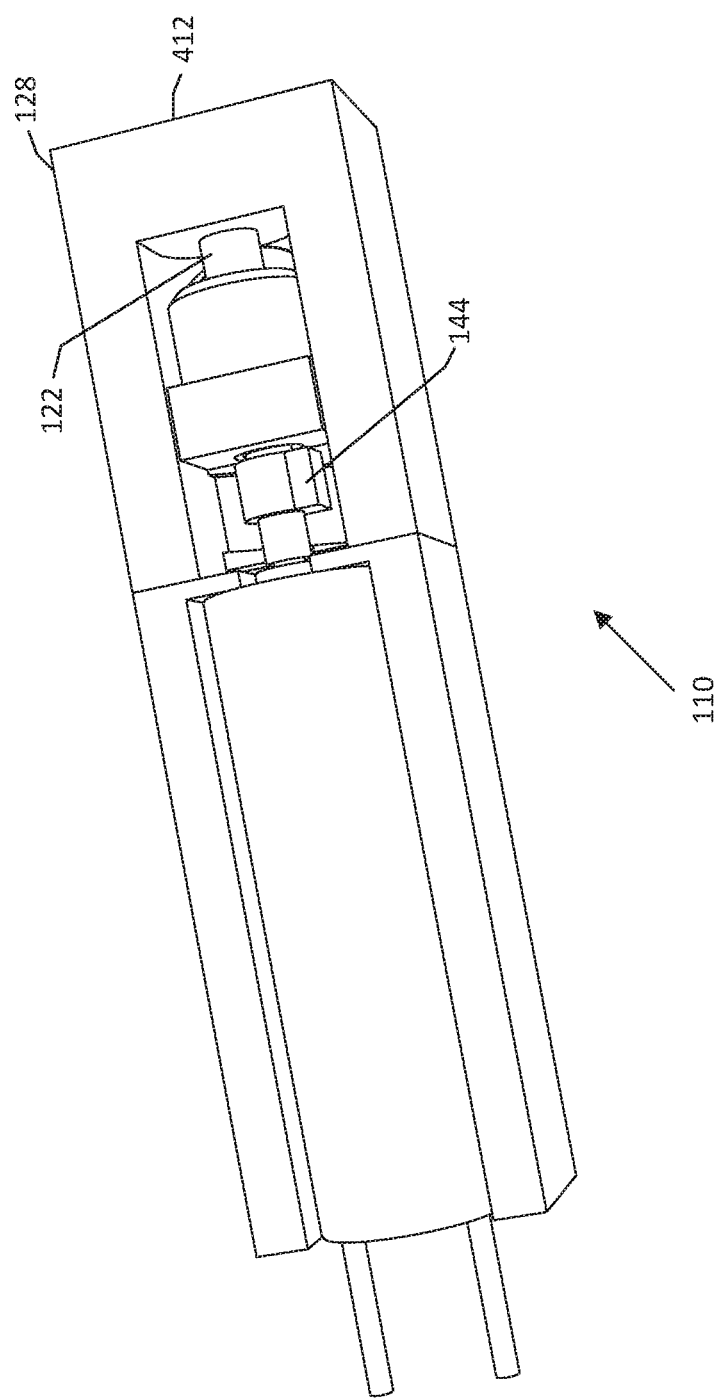
FIG. 10 depicts a perspective view of an example tactile pin actuator system.
Figure 11:
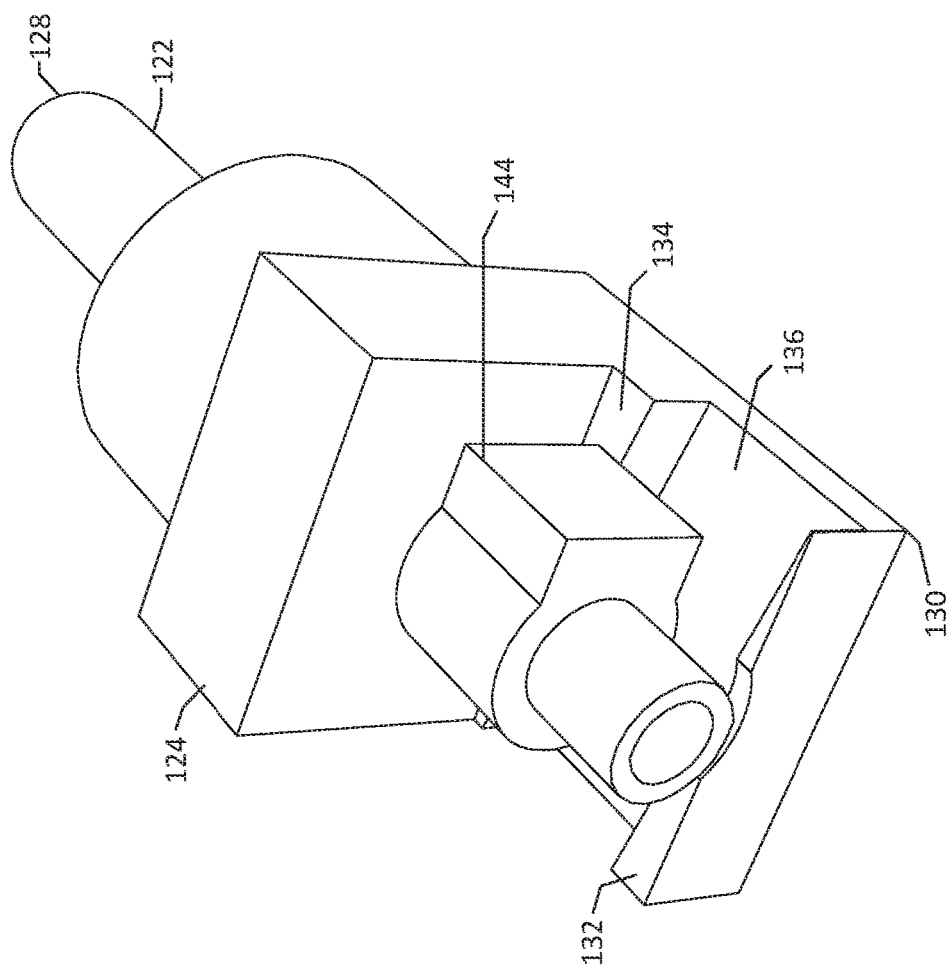
FIG. 11 depicts a perspective view of an example tactile pin assembly and attached stop assembly.

As shaft 146 continues to rotate in the second rotational direction, projection 144 moves through recess 136 as pin actuator assembly 120 continues moving toward shaft. Eventually rotation of shaft 146 and lateral movement of pin actuator assembly 120 ends when projection 144 comes into contact with second surface 134 of stop assembly 130. In an example embodiment, projection 144 may rotate two and a half times in traveling between abutting first surface 132 and second surface 134. FIG. 10 provides a perspective view of pin actuator system 110 wherein shaft 146 has been rotated so that projection 144 has come into contact with second surface 134 of stop assembly 130. In the illustrated embodiment, when shaft 146 has been rotated to the extent that projection 144 has been stopped at surface 134, rounded end 128 of pin 122 has been withdrawn and is positioned below external surface 412 of housing 154. FIG. 11 provides an isolated perspective view of projection 144 relative to stop assembly 130. As shown, a second side of projection 144 has come into contact with or abutted second surface 134 of stop assembly 130 and thereby prevented further rotation of shaft 146 and further lateral movement of pin actuator system 110.

FIGS. 12A and 12B provide side views and corresponding sectional views of pin actuator system 110 positioned as shown in FIGS. 10 and 11. FIG. 12A provides a side view of pin actuator system 110 wherein shaft 146 has been rotated to an extent that projection 144 has abutted second surface 134 of stop assembly 130. As shown, rounded end 128 of pin 122 is positioned below external surface 412 of housing 154. FIG. 12A provides a sectional view taken along section line C-C. As shown, in the scenario wherein shaft 146 has been rotated to the extent that projection 144 has abutted second surface 134 of stop assembly 130, tactile pin assembly 120 has moved laterally in vault 156 toward lead screw 140 attached to shaft 146. Accordingly, a gap 810 between lead screw 140 and the bottom of recess 126 which existed when projection abutted first surface 132, has been reduced or no longer exists when projection 144 abuts second surface 134 of stop assembly 130. FIG. 12B provides a side view of the pin actuator system 110 from another perspective along with a sectional view taken along section line D-D. FIG. 12B similarly illustrates end 128 of pin 122 positioned at or below external surface 412 of housing 154, as well as the reduction or elimination of gap 810 between lead screw 140 and a bottom or end of recess 126.

Example Pin Actuator Module

According to another aspect of the disclosed embodiments, a plurality of tactile pin actuator systems 110 may be packaged together into a tactile pin module. In an example embodiment, tactile pin actuators 110 are positioned relative to each other so that the retractable tactile pins are positioned to represent one or more braille cells. In an example embodiment, a module comprises a plurality of tactile pin actuator systems that are arranged side-by-side in a 3 by 2 array (3 rows of 2 columns). The tactile pin module comprises an external surface with a plurality of apertures formed therein. In an example embodiment, the apertures are formed in a 3 by 2 matrix, with each tactile pin module aligned with one of the apertures. The individual tactile pin actuators may be operated to cause the corresponding tactile pin to extend beyond the external surface and to be withdrawn below the external surface. A module may comprise any suitable number of tactile pin actuators in order to form a desired number of refreshable braille cells. In an example embodiment, a module comprises twenty four actuator systems that are arranged in four side-by-side 3 by 2 arrays so as to represent four braille cells.

FIGS. 13A-13C provide perspective views of an example pin actuator module 1310. FIG. 13D provides a top view, and FIGS. 13E and 13F provide side views of example pin actuator module 1310. As shown, example pin actuator module 1310 comprises a body 1312 with an external surface 1314 comprising a plurality of apertures or holes 1316 from which tactile pins may be selectively extended. As shown, each of the apertures 1316 is adapted to accommodate a tactile pin extending through the particular aperture 1316 and above external surface 1314. Apertures 1316 are arranged in a pattern corresponding to braille cells. In an example embodiment apertures 1316 are arranged into 3 by 2 arrays. In the particular embodiment depicted in FIGS. 13A-13C, module 1310 comprises four 3 by 2 arrays of apertures arranged and spaced so as to correspond to four braille cells.

Figure 13G:
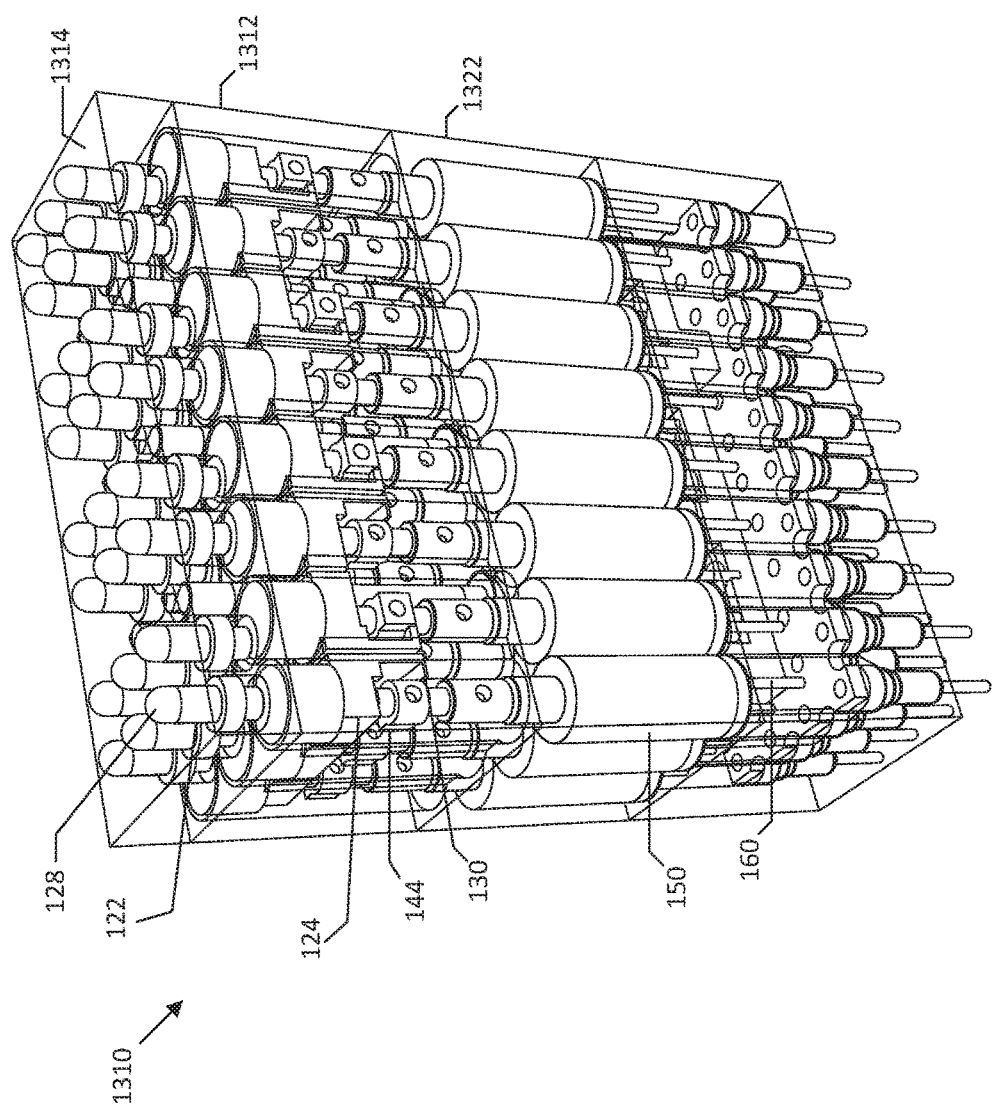
FIG. 13G depicts a perspective view of an example tactile pin actuator module.
Figure 13H:
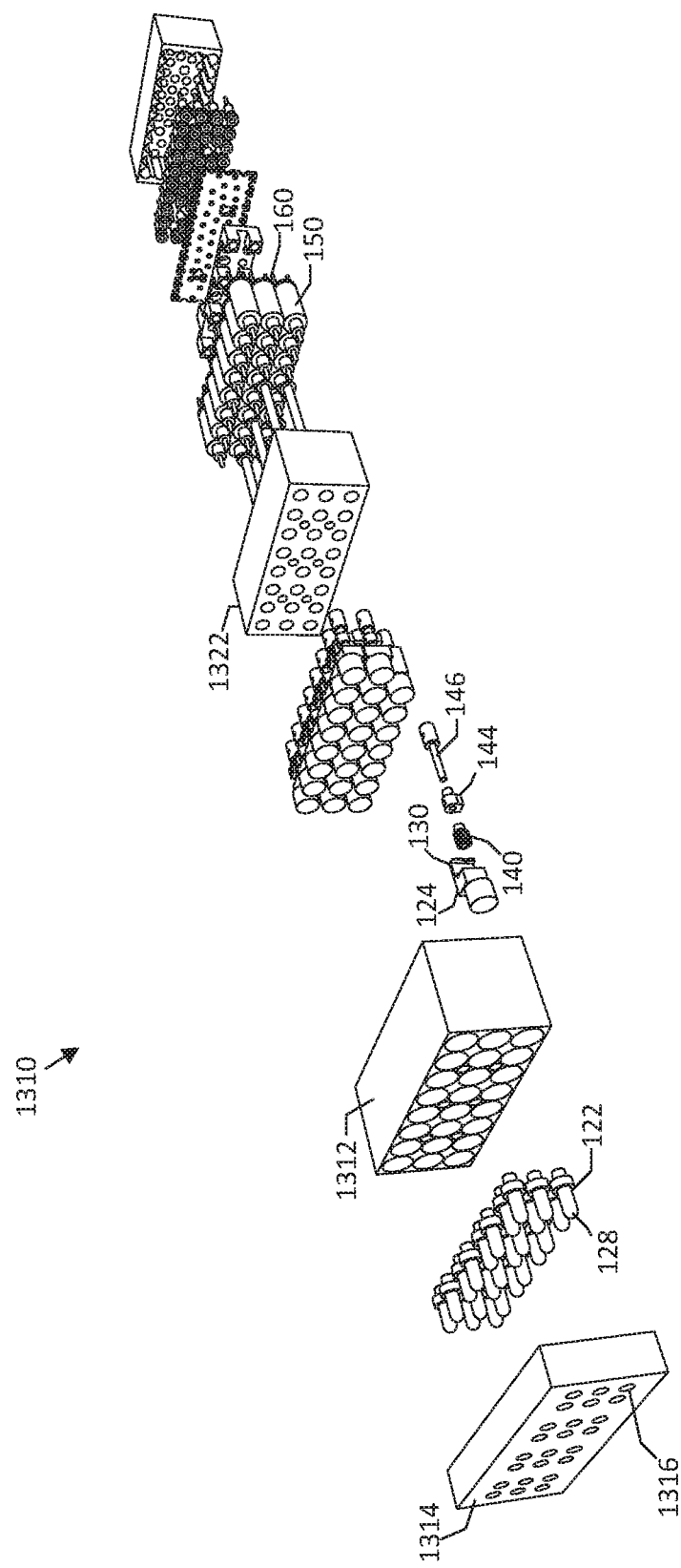
FIG. 13H depicts an exploded view of an example tactile pin actuator module.

FIG. 13G depicts pin actuator module 1310 with body 1312 shown in transparency. FIG. 13H depicts an exploded view of pin actuator module 1310. As illustrated, pin actuator module comprises a plurality of pin actuator systems 110, each of which is adapted to control the movement of a tactile pin above and below external surface 1314. The pin actuator systems 110 are as described above in connection with FIGS. 1-12. Accordingly, each pin actuator system 110 comprises a tactile pin 122 with a base 124 and integrally formed stop assembly 130. A screw thread on lead screw 140 engages a screw thread on recess 126 to cause lateral movement of tactile pin 122 in response to rotational movement of shaft 146. Rotational movement of shaft 146 is limited by projection 144 coming into contact with first and second surfaces 132 and 134 of stop assembly 130. In the example embodiment of FIG. 13, each base 124 abuts at least one base 124 of an adjacent pin actuator system 110. For those pin actuator systems 110 positioned along the periphery of the module 1310, the base 124 abuts and forms an interference fit with housing body 1312. The frictional fit formed between bases 124 and housing body 1312 prevents the individual systems 110 from rotating in response to rotational movement of the corresponding lead screw 140, which causes the rotational movement to be transformed into lateral movement of tactile pin 122 relative to external surface 1314. It will be appreciated that in such an embodiment where bases 124 of adjacent 124 form an interference fit which each other, individual actuator systems 110 within module 1310 may not comprise a separate vault formed by a housing block. Each of a plurality of corresponding motors 150 is situated in motor mount 1322. Each of the plurality of motors 150 is controlled using the corresponding lead wires 160 extending from a bottom surface of module 1310. Each of the lead wires 160 may be electrically coupled to a control circuit for purposes of controlling the operation of the motors 150 and thereby controlling the extending and withdrawing of pins 122 from external surface 1314. The motors may be controlled so as to form braille characters at the four side-by-side 3 by 2 arrays of orifices.

Figures 13I, 13J:
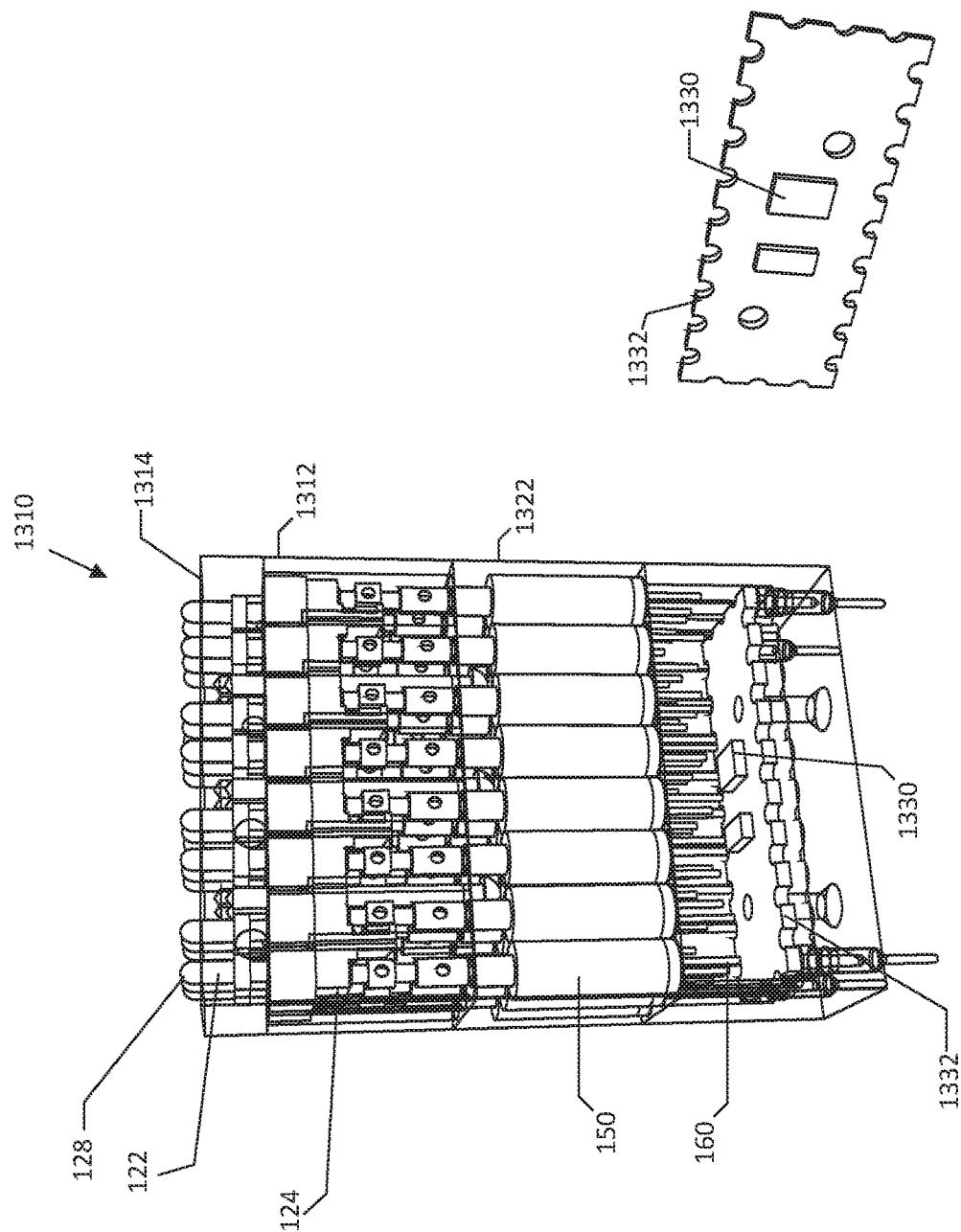
FIG. 13I depicts a perspective view of an example tactile pin actuator module with control circuitry.
FIG. 13J depicts an isolated perspective view of an example circuit board for use in an example tactile pin actuator module.

FIG. 13I depicts pin actuator module 1310 with control circuits 1330 comprised therein for controlling the operation of pin actuator systems 110. As shown, pin actuator module 1310 may comprise circuit board 1332 with one or more control circuits 1330 seated thereon. FIG. 13J depicts an isolated view of circuit board 1332 with control circuits 1330 thereon. While two control circuits 1330 are shown, any suitable number of control circuits 1330 may be employed to provide the functionality as described herein. Circuit board 1332 and control circuits 1330 are electrically and communicatively coupled to pin actuator systems comprised in module 1310. In an example embodiment, pin actuator module 1310 and circuit board 1332 utilize the Inter-Integrated Circuit protocol (I2C) and a 2-wire electrical bus that is adapted to receive and transmit digital data. The serial digital interface may be adapted to allow for multiple pin actuator modules 1310 to be daisy-chained together to build braille display systems using a minimal number of connections, e.g., 2 connections each.

Control circuits 1330 may be programmed to perform any necessary functions within module 1310. In an example embodiment, control circuits 1330 may be programmed to, for example, load data into the pin actuator systems in order to raise and lower pins 122, verify that pin positions match the intended positions, and sense the location of the reader's touch on the surface of the module on a braille cell by cell basis.

In an example embodiment, control circuits 1330 may raise and lower pins 122 by accepting serial data and control codes into a serial in-parallel output shift register scheme. Custom logic within control circuits 1330 may be used to power motors 150 to place the pins in the desired state. In an example embodiment, serial data may contain the desired pin positions and control codes may be used to communicate with the actuator pin modules in order to raise and/or lower the pins. Control circuits 1330 may be programmed to raise pins sequentially so as to save power for normal reading. Control circuits 1330 may also be programmed to raise pins simultaneously for high speed scanning of written material.

In an example embodiment, control circuits 1330 may be programmed to detect the position of a pin actuator by pulsing the rotor windings in the motor 150 and analyzing the resulting waveforms. Control circuit 1330 may compare the derived data to input data in order to verify the integrity of the displayed data. If the two sets of data do not match, control circuit 1330 may be programmed to attempt to raise or lower incorrectly positioned pins a set number of times. If control circuit 1330 determines the pins are still not correctly located, control circuit 1330 may transmit an error code to the host processor for handling.

In an example embodiment, sensing the reader's touch location may be accomplished using a plurality, e.g., 4, electrodes located on external surface 1314 between the columns of each braille cell. The electrodes may be communicatively coupled to control circuit 1330. Control circuit 1330 uses measurements from the electrodes to identify the pin(s) being read by the reader, and transmits touch location data to the host processor to be used for setting cursor location on the display.

Example Braille Display System

According to another aspect of the disclosed embodiments, a plurality of pin actuator modules 1310 may be positioned relative to each other so as to form a braille display system. An example braille display system comprises a body with a recess formed therein. The recess is shaped so as to accommodate a plurality of tactile pin modules 1310. The modules are arranged side by side so as to form an elongated array of refreshable braille cells. The display system may further comprise a computing device such as, for example, a cell phone or tablet computer, which is communicatively coupled to the plurality of tactile pin modules 1310 and the individual pin actuators 110 comprised in the modules. The computing device is programmed to communicate signals to pin actuators 110 so as to raise and lower tactile pins in order to form braille characters on the external surface of the modules.

Figure 14A:
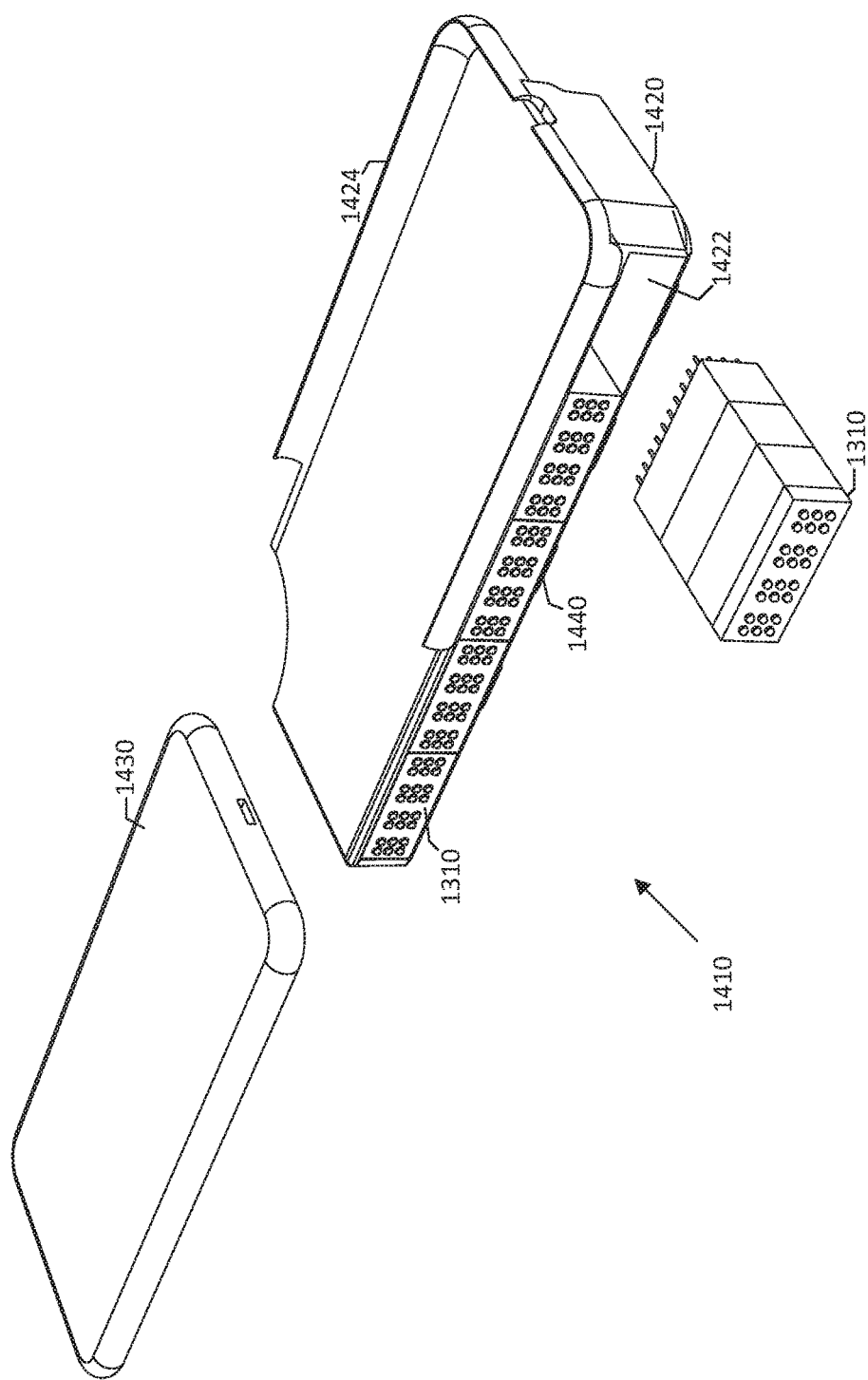
FIG. 14A depicts a partially exploded view of an example braille display.

FIGS. 14A-14I depict an example braille display system 1410. As shown in FIG. 14A, an example braille display system 1410 comprises a body 1420. Body 1420 has one or more recesses 1422 formed therein adapted to receive a plurality of pin actuator modules 1310. In the example embodiment depicted in FIG. 14A, five pin actuator modules 1310 have been inserted into recess 1422 and form an array of 20 braille cells for purposes of displaying braille characters. In the example embodiment depicted in FIG. 14, actuator modules 1310 are positioned side-by-side in recess 1422.

Example body 1420 further comprises a retainer 1424 adapted to form a mechanical coupling with an electronic computing device 1430. Retainer 1424 may be configured in any suitable manner to mechanically couple computing device 1430 to body 1420. In an example embodiment, retainer 1424 comprises a concave wall that overhangs body 1420 and forms a retaining edge or lip. Retainer 1424 forms a recess into which computing device 1430 is received and with which computing device 1430 is mechanically secured. In the example embodiment of FIG. 14, retainer 1424 is sized and positioned so as to interface with computing system 1430 that has the form factor of a mobile phone. Computing system 1430 mechanically interfaces with retainer 1424 and is held in position relative to body 1420 by mechanical and frictional interference between retainer 1424 and computing system 1430. Retainer 1424 is shaped so as to allow for access to input/output features such as buttons and ports comprised in system 1430. FIGS. 14B and 14C provide additional perspective views of braille display system 1410. FIG. 14D, E, F, G, H, and I provide top, bottom, and side views, respectively of braille display system 1410.

Computing system 1430 is programmed to communicate signals to pin actuators 110 comprised in modules 1310 so as to raise and lower tactile pins in order to form braille characters. Computing system 1430 may be communicatively coupled to modules 1310 and pin actuators 110 in any suitable manner including, for example, via wireless communication, e.g., Bluetooth, between computing system 1430 and a wireless transmitter/receiver comprised in body 1420 that is adapted to communicate with modules 1310. In an alternative embodiment, communication may take place via a physical connection established from a physical communication port of computing system 1430 to control circuitry within body 1420 for communicating with modules 1310. Computing system 1430 communicates data and control signals which result in tactile pins in modules 1310 being raised in desired patterns to form braille characters. Using the array of characters formed across the modules, the user is able to read the braille writing. The user may employ buttons 1440 formed on body 1420 to request new data from computing system 1430 for display as braille characters on modules 1310.

Figure 15A:
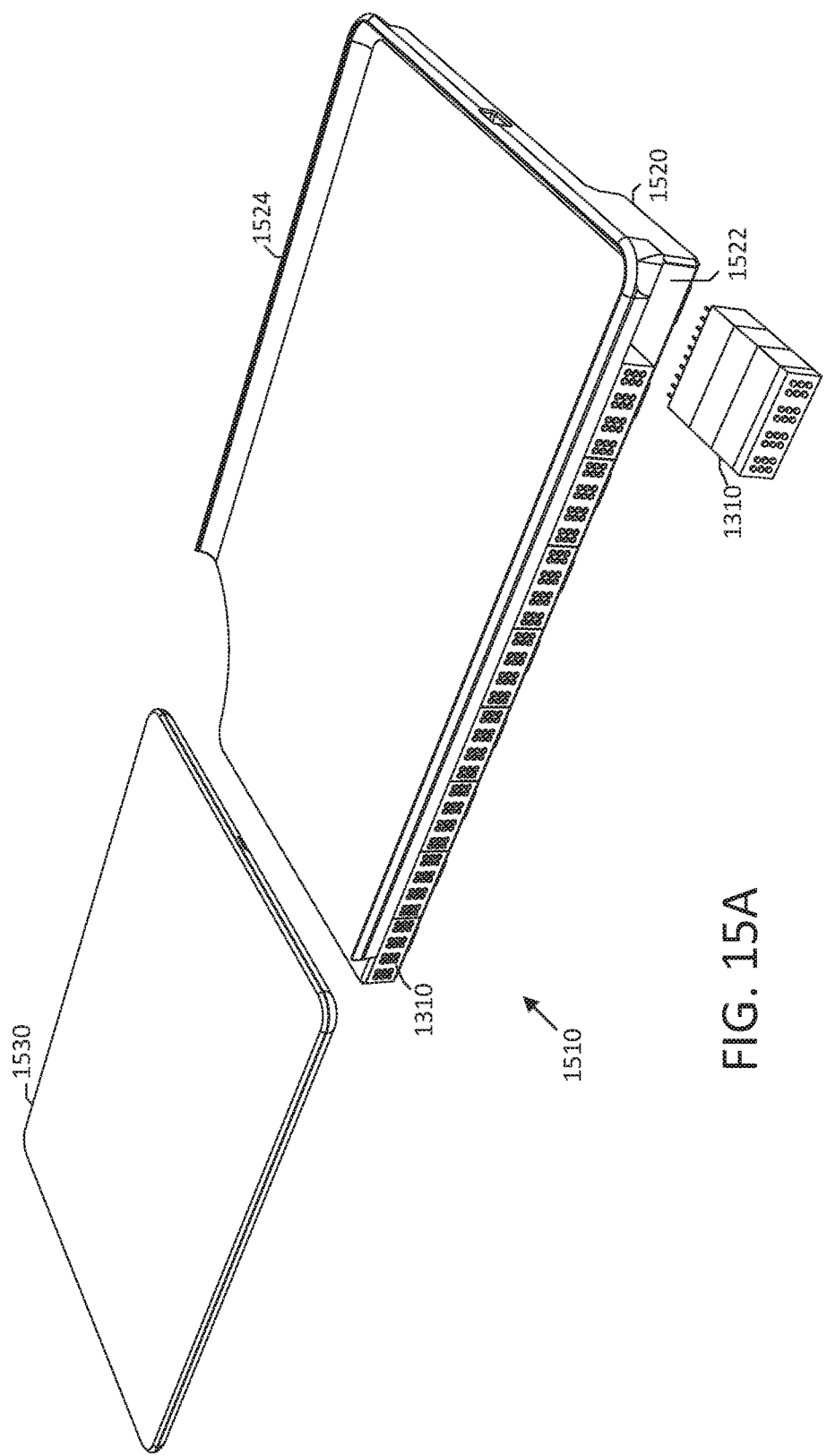
FIG. 15A depicts a partially exploded view of an example braille display.
Figure 15B:
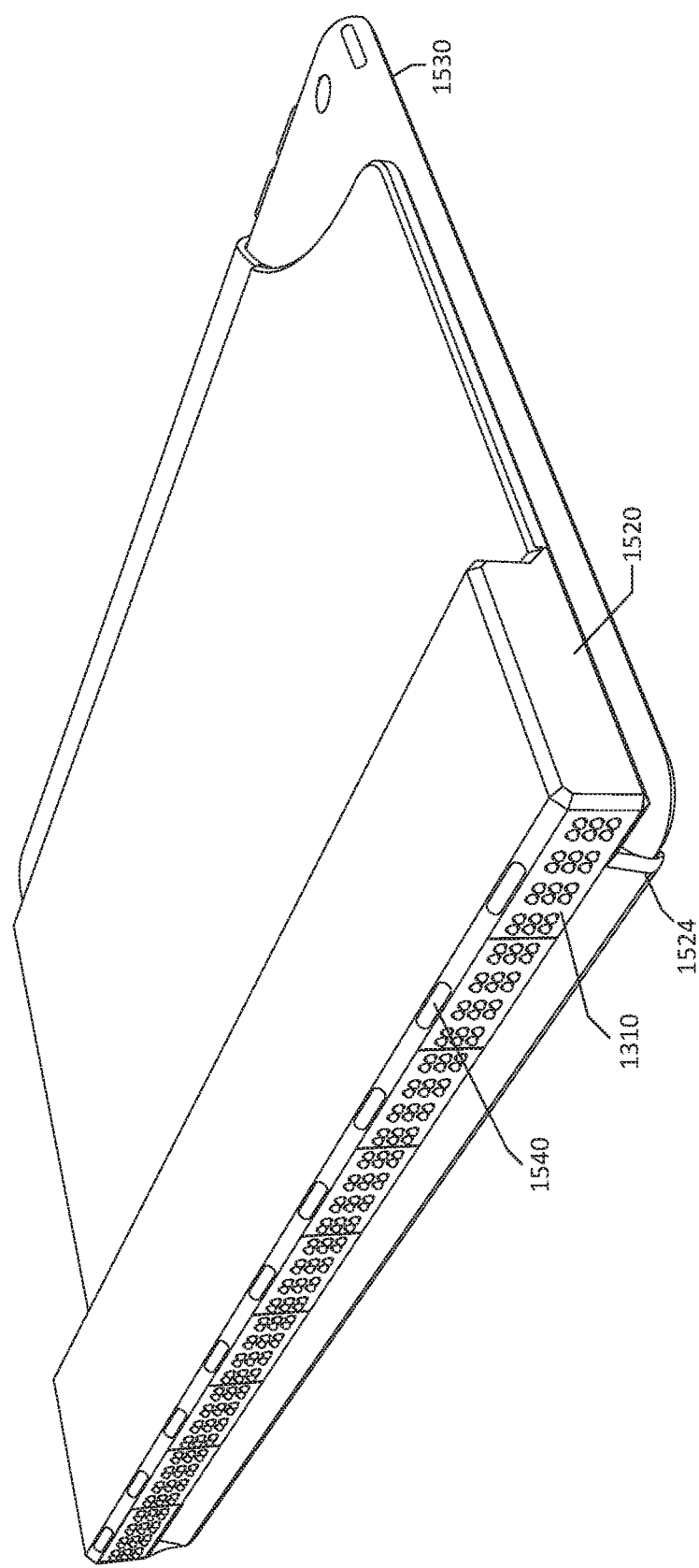
FIGS. 15B, 15C, and 15D depict perspective views of an example braille display.
Figure 15C:
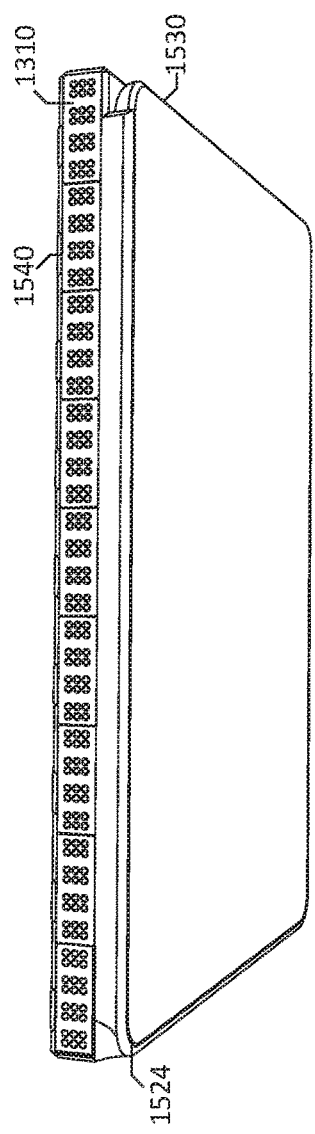
Figure 15D:
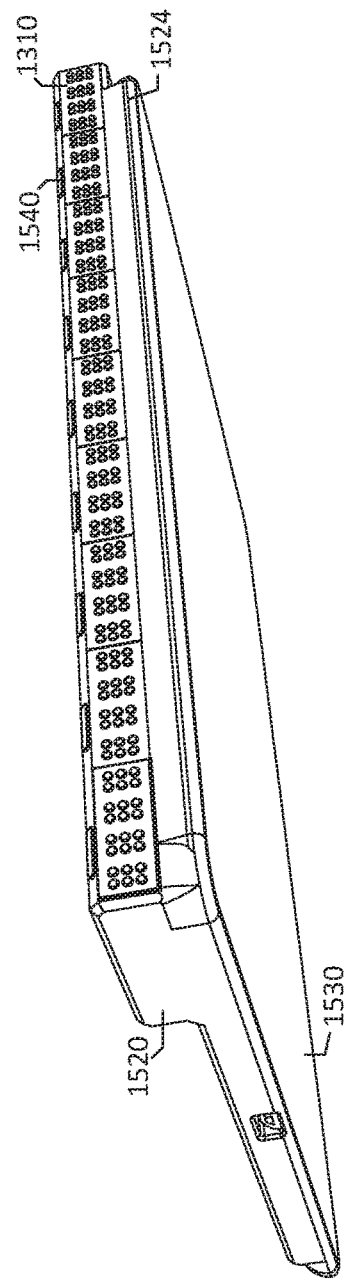
Figure 15H:
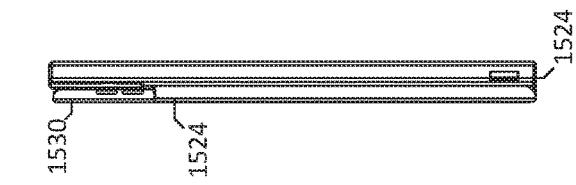
FIGS. 15E, 15F, 15G, 15H, 15I and 15J depict a top view, a bottom view, a side view, a side view, a side view, and a side view, respectively, of an example braille display.
Figure 15G:
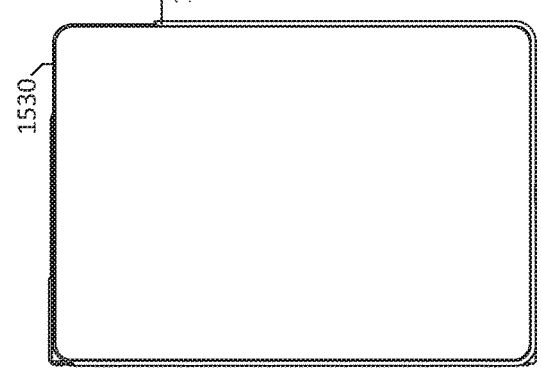
Figure 15F:
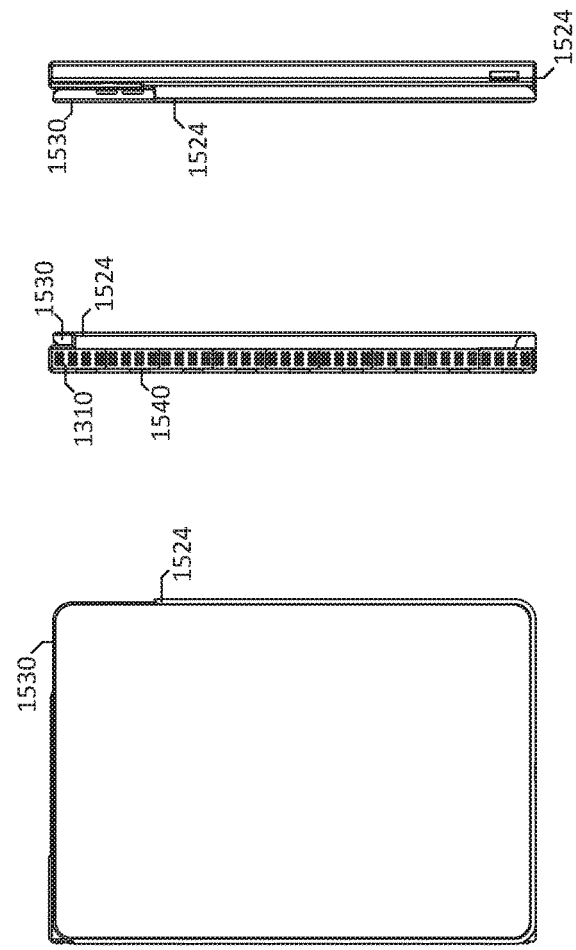
Figure 15J:
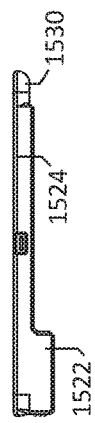
Figure 15E:
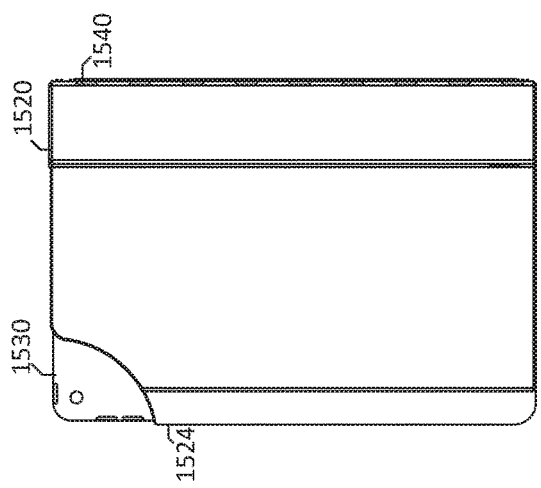
Figure 15I:
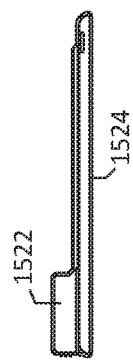

FIGS. 15A-15I depict another example braille display system 1510. Braille display system 1510 is similar to braille display system 1410 in that it comprises a body 1520, one or more recesses 1522 formed therein adapted to receive a plurality of pin actuator modules 1310, and retainer 1524. Braille display system 1510 has a larger form factor and is adapted to receive a larger computing system 1530. In an example embodiment, the larger computing system 1530 may be a tablet computer. The larger form factor also allows for a larger number of modules 1310 to be received into recess 1522 as compared to embodiment 1410. FIGS. 15B, 15C, and 15D provide additional perspective views of braille display system 1510. FIGS. 15E and F provide top and bottom views. FIGS. G, H, I, and J provide side views of braille display system 1510. Computing system 1530 controls actuator systems comprised in modules 1310 to display braille characters. The operator of system 1510 uses buttons 1540 to control the display of braille on system 1510.

Figure 16A:
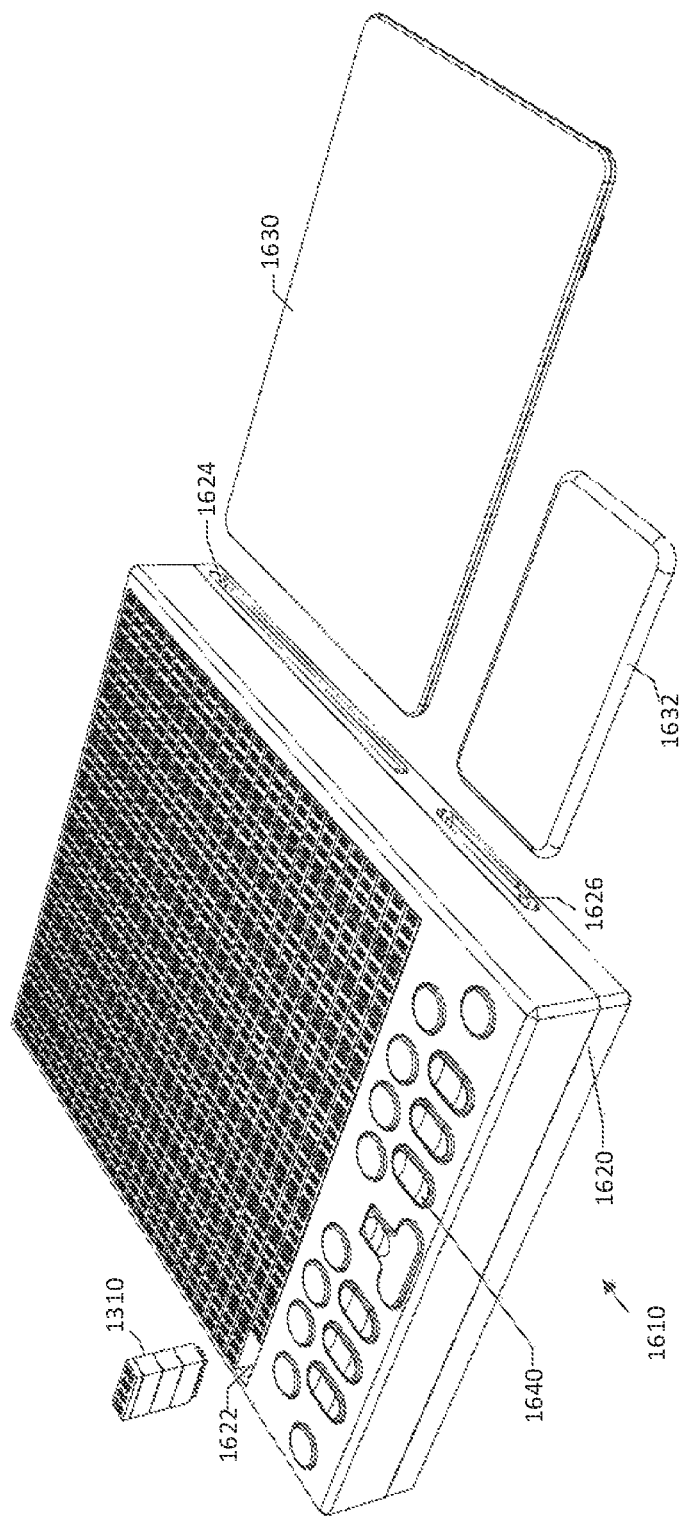
FIG. 16A depicts a partially exploded view of an example braille display.

FIGS. 16A-16E depict another example braille display system 1610. As shown in FIG. 16A, an example braille display system 1610 comprises a body 1620 that has recesses 1622 formed therein adapted to receive a plurality of pin actuator modules 1310. Example display system 1610 has an even larger form factor than the embodiment depicted in FIG. 15 and therefore has a larger recess 1622 for receiving a larger number of actuator modules 1310. In the example embodiment of FIG. 16, recess 1622 accommodates a two dimensional array of actuator modules 1310. More particularly, in the example embodiment of FIG. 16, a 25 by 10 array of actuator modules 1310 are positioned side-by-side and top-to-bottom in recess 1622. Each actuator module 1310 comprises four side-by-side array of refreshable braille cells. The relatively larger number of braille cells comprised in display system 1610 allow for displaying more information at once thereby greatly improving the experience of the reader.

Example body 1620 further comprises two retainers 1624 and 1626 each of which is adapted to form a mechanical coupling with an electronic computing device. Retainers 1624 and 1626 may be configured in any suitable manner to mechanically couple a computing device to body 1620. In an example embodiment, retainer 1624 comprises a recess formed in body 1620. Recess 1624 is sized so as to accommodate all or a portion of example computing system 1630 into recess 1624. Recess 1624 is sized and shaped so as to form a mechanical fit with computing system 1630 and thereby retain computing system 1630 to body 1620. In an example configuration, computing system 1630 is a tablet computing system and recess 1624 is sized and shaped so as to receive computing system 1630 into the recess and form a mechanical coupling with computing system 1630. In an example embodiment, retainer 1626 likewise comprises a recess formed in body 1620. Recess 1626 is sized so as to accommodate all or a portion of example computing system 1632 into recess 1626. In an example configuration, computing system 1632 is a phone computing system and recess 1626 is sized and shaped so as to receive computing system 1632 into the recess and form a mechanical coupling with computing system 1632. It will be appreciated that while FIG. 16A depicts two devices 1630 and 1632 aligned for coupling with housing 1620, display 1610 may be operated with only of devices 1630 and 1632 received into housing 1620 and communicating with the array of actuator modules 1310.

Computing systems 1630 and 1632 are programmed to communicate signals to pin actuators 110 comprised in modules 1310 so as to raise and lower tactile pins in order to form braille characters. Computing systems 1630 and 1632 may be communicatively coupled to modules 1310 and pin actuators 110 in any suitable manner including, for example, via wireless communication between computing systems 1630 and 1632 and a wireless transmitter/receiver comprised in body 1620 that is adapted to communicate with modules 1310. In an alternative embodiment, communication may take place via a physical connection established from a physical communication port of either of computing systems 1630 and 1632 to control circuitry within body 1620 for communicating with modules 1310.

As shown, braille display 1610 comprises buttons 1640 adapted to receive user inputs for controlling the text displayed on device 110. For example, buttons 1640 may be used to refresh the text displayed by device 160.

Figure 16B:
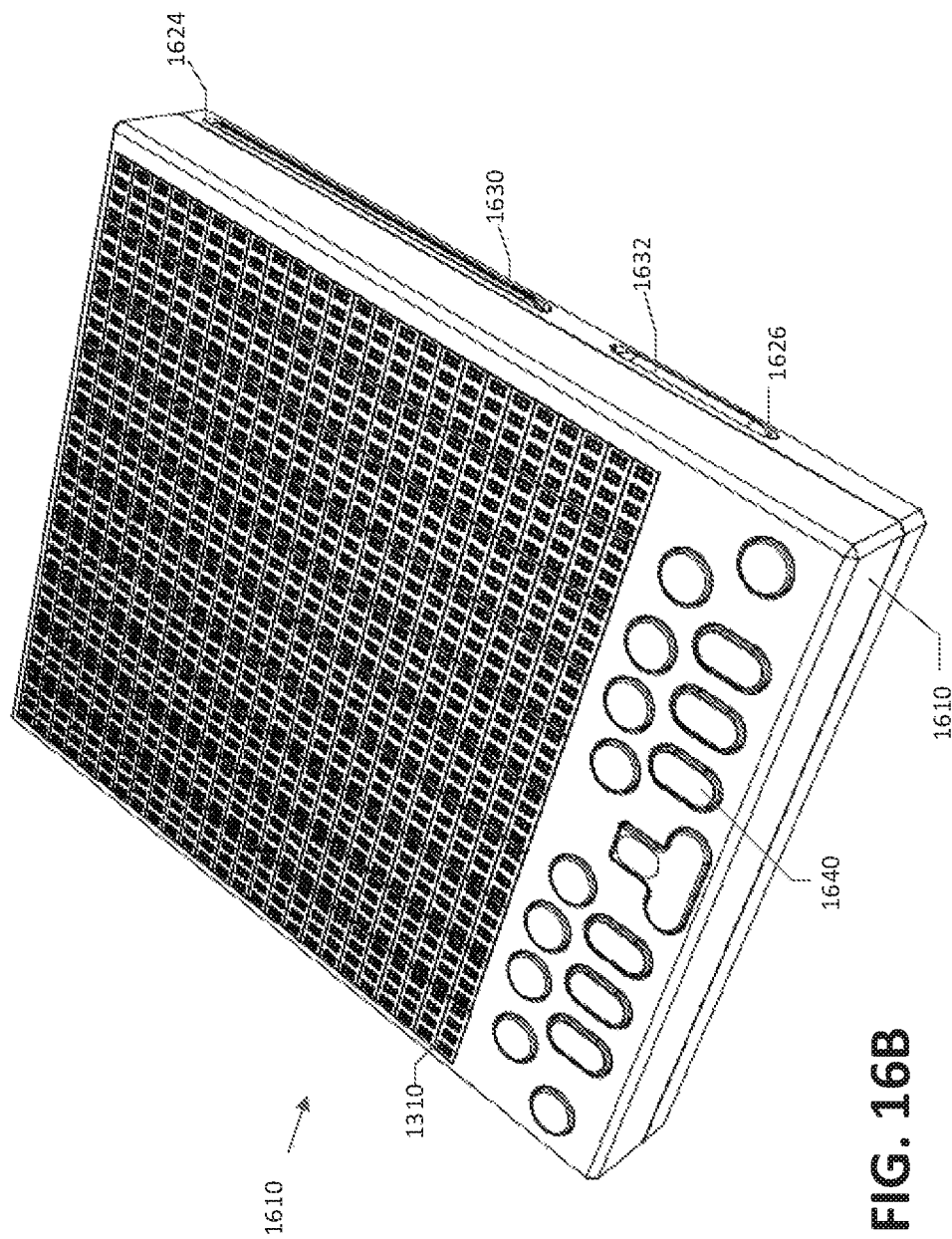
FIG. 16B depicts a perspective view of an example braille display.

FIG. 16B provides a second perspective view of display device 1610. In the example depiction, devices 1630 and 1632 are shown inserted into retainers 1624 and 1626 respectively. FIGS. 16C, 16D, and 16E provide top and side views of example display system 1610.

Example Architecture

Figure 17:
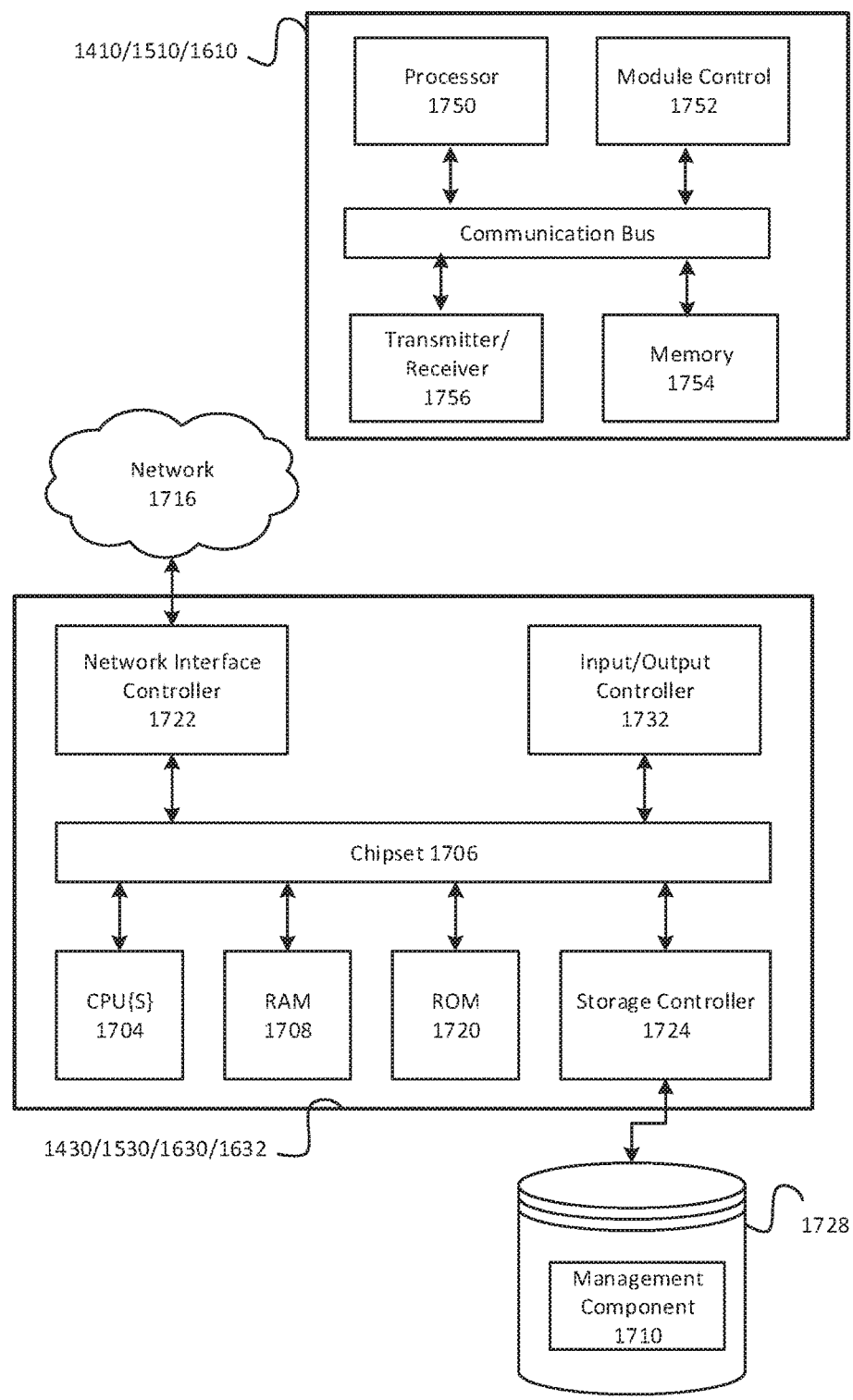
FIG. 17 depicts a block diagram illustrating an example hardware/software architecture for braille displays.

FIG. 17 depicts a block diagram illustrating an example hardware/software architecture for braille displays 1410, 1510, and 1610 and computing devices 1430, 1530, 1630 and 1632. As shown, in an example embodiment, braille display systems 1410/1510/1610 comprise processor 1750, tactile actuator module control 1752, memory 1754, and a transmitter/receiver 1756. Transmitter/receiver 1756 is adapted to receive signals and data from computing device 1430/1530/1630 and communicate the signals and data to processor 1750. Transmitter/receiver 1756 may be adapted to communicate signals and data via any suitable medium and using any suitable protocol. In an example embodiment, transmitter/receiver 1756 may comprise hardware and software adapted for sending and receiving signals wirelessly using the Bluetooth protocol. In another embodiment, transmitter/receiver 1756 may comprise hardware and software adapted to send data via a physical bus connection via a physical port of a computing device 1430/1530/1630/1632.

Processor 1750 is programmed to communicate with transmitter/receiver 1756 and tactile actuator module control 1752. Processor 1750 may be any suitable hardware programmed to interface with transmitter/receiver 1756 and actuator module control 1752. Processor may be programmed to receive control signals and data from transmitter/receiver 1756 and to send corresponding control signals to actuator module control 1752.

Actuator module control 1752 may comprise hardware and/or software adapted to send control signals to individual actuators 110 embodied in the actuator modules 1310 comprised in a braille display. In an example embodiment, actuator module control 1752 may comprise hardware and software adapted to send control signals to control circuits 1330 comprised in modules 1310, which circuits 1330 use the received signals to raise and lower individual pins in the particular module. Computing memory 1754 is employed as needed to support operations of the display.

FIG. 17 also depicts an example architecture for a computing system 1430/1530/1630/1632. The computer architecture illustrates a conventional computing system which may have any suitable form factor including, for example, laptop, tablet, network appliance, PDA, e-reader, digital cellular phone, or other computing node, and may be utilized to communicate data and signals in order to create braille characters using modules 1310.

Computer 1700 may include a baseboard, or "motherboard," which is a printed circuit board to which a multitude of components or devices may be connected by way of a system bus or other electrical communication paths. One or more central processing units (CPUs) 1704 may operate in conjunction with a chipset 1706. CPUs 1704 may be standard programmable processors that perform arithmetic and logical operations necessary for the operation of computer 1700.

CPUs 1704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 1706 may provide an interface between CPUs 1704 and the remainder of the components and devices on the baseboard. Chipset 1706 may provide an interface to a random access memory (RAM) 1708 used as the main memory in computer 1700. Chipset 1706 may further provide an interface to a computer-readable storage medium, such as a read-only memory (ROM) 1720 or non-volatile RAM (NVRAM) (not shown), for storing basic routines that may help to start up computer 1700 and to transfer information between the various components and devices. ROM 1720 or NVRAM may also store other software components necessary for the operation of computer 1700 in accordance with the embodiments described herein.

Computer 1700 may operate in a networked environment using logical connections to remote computing nodes and computer systems through network 1716. Chipset 1706 may include functionality for providing network connectivity through a network interface controller (NIC) 1722, such as a gigabit Ethernet adapter. NIC 1722 may be capable of connecting the computer 1700 to other computing nodes over network 1716. It should be appreciated that multiple NICs 1722 may be present in computer 1700, connecting the computer to other types of networks and remote computer systems.

Computer 1700 may be connected to a mass storage device 1728 that provides non-volatile storage for the computer. Mass storage device 1728 may store system programs, application programs, other program modules, and data, which have been described in greater detail herein. Mass storage device 1728 may be connected to computer 1700 through a storage controller 1724 connected to chipset 1706. Mass storage device 1728 may consist of one or more physical storage units. Storage controller 1724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computer 1700 may store data on mass storage device 1728 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 1728 is characterized as primary or secondary storage and the like.

For example, computer 1700 may store information to mass storage device 1728 by issuing instructions through storage controller 1724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 1700 may further read information from mass storage device 1728 by detecting the physical states or characteristics of one or more particular locations within the physical storage units.

In addition to mass storage device 1728 described above, computer 1700 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 1700.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

Mass storage device 1728 may store an operating system utilized to control the operation of the computer 1700. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 1728 may store other system or application programs and data utilized by computer 1700, such as management component 1710 and/or the other software components described above.

Mass storage device 1728 or other computer-readable storage media may also be encoded with computer-executable instructions, which, when loaded into computer 1700, transforms the computer from a general-purpose computing system into a special-purpose computer capable of implementing the embodiments described herein. These computer-executable instructions transform computer 1700 by specifying how CPUs 1704 transition between states, as described above. Computer 1700 may have access to computer-readable storage media storing computer-executable instructions, which, when executed by computer 1700, may perform operating procedures for interfacing with displays 1410/1510/1610 to provide refreshable braille writing.

Computer 1700 may also include an input/output controller 1732 for receiving and processing input from a number of input devices, such as a keyboard, a mouse, a touchpad, a touch screen, an electronic stylus, or other type of input device. Similarly, input/output controller 1732 may provide output to a display, such as a computer monitor, a flat-panel display, a digital projector, a printer, a plotter, or other type of output device. It will be appreciated that computer 1700 may not include all of the components shown in FIG. 17, may include other components that are not explicitly shown in FIG. 17, or may utilize an architecture completely different than that shown in FIG. 17.

Accordingly, Applicant has disclosed systems for actuating tactile pins. An example tactile pin actuator system comprises a tactile pin assembly that includes a tactile pin and a recess that has a first screw thread formed thereon. A stop assembly is rigidly coupled relative to the tactile pin actuator. A lead screw attached to a shaft is positioned in the recess and is mechanically engaged with the first screw thread. A projection, which may be, for example, a cam, extends axially from the shaft and is secured relative to the shaft. Rotation of the shaft in a first rotational direction relative to the tactile pin assembly causes the tactile pin assembly to move linearly in a first linear direction away from the shaft. Rotation of the shaft in the first rotational direction is limited by, and ceases when the projection comes into contact with the first surface of the stop assembly. Rotation of the shaft in a second rotational direction relative to the tactile pin assembly causes the tactile pin assembly to move linearly in a second direction toward the shaft. Rotation of the shaft in the second direction is limited by, and ceases when the projection comes into contact with the second surface of the stop assembly.

It will be appreciated that while example embodiments have been described, the intended embodiments extend to all tactile pin actuators consistent with the description herein. For example, while in the example embodiments, the tactile pin assembly is disposed in a housing separate from the corresponding motor, in other instances, the tactile pin assembly may be comprised in the same housing as the motor. In such an embodiment, the tactile pin assembly and stop assembly may be disposed within the motor housing which has an aperture formed therein corresponding to the tactile pin. In response to rotation by the motor, the tactile pin may be extended and withdrawn from the motor housing. While the example embodiments have been described as forming braille cells of up to six braille dots, the intended embodiments include modules that contain more or less than six braille dots per braille cell. Similarly, while the example embodiments have been described as containing particular numbers and orientations of pin actuator modules, any number and orientation of pin actuator modules may be employed.

It should be appreciated that the subject matter presented herein that is described as being performed by computing systems 1430, 1530, and 1630 may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

It will be appreciated that while illustrative embodiments have been disclosed, the scope of potential embodiments is not limited to those explicitly described. For example, while the concepts are described with reference to requests received to perform particular types of functions or commands, the envisioned embodiments extend to processing involving any and all types of functions and commands. Similarly, while the concepts are described with reference to particular protocols and formats, the envisioned embodiments extend to processing involving any and all types of protocols and formats.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A system comprising:
a tactile pin;
a shaft movably coupled to the tactile pin;
a projection secured relative to the shaft, the projection adapted to rotate with the shaft;
a first surface; and
a second surface,
wherein rotation of the shaft in a first rotational direction relative to the tactile pin causes the projection to rotate in the first rotational direction and the tactile pin to move linearly in a first linear direction away from the shaft, rotation of the shaft in the first rotational direction limited by the projection coming into contact with the first surface, and
wherein rotation of the shaft in a second rotational direction relative to the tactile pin causes the projection to rotate in the second rotational direction and the tactile pin to move linearly in a second linear direction toward the shaft, rotation of the shaft in the second rotational direction limited by the projection coming into contact with the second surface.

2. The system of claim 1, wherein the first surface and second surface are rigidly coupled relative to the tactile pin.

3. The system of claim 2, wherein movement linearly of the tactile pin in the first linear direction away from the shaft causes the first surface and the second surface to move linearly in the first linear direction and movement linearly of the tactile pin in the second linear direction toward the shaft causes the first surface and the second surface to move linearly in the second linear direction.

4. The system of claim 1, further comprising:
a recess having a first screw thread formed thereon, the recess rigidly coupled relative to the tactile pin;
a second screw thread secured relative to the shaft and mechanically engaged with the first screw thread.

5. The system of claim 4, wherein rotation of the shaft causes the second screw thread to interface with the first screw thread resulting in movement of the tactile pin.

6. The system of claim 4,
wherein the projection is secured relative to the shaft so that rotation of the shaft causes the projection to move from a position in contact with the first surface and into contact with the second surface.

7. The system of claim 6, wherein the projection is a cam.

8. The system of claim 7, wherein a gap is formed between the first surface and second surface.

9. The system of claim 1, further comprising a housing, the housing having an interference fit with the tactile pin, the housing preventing the tactile pin from rotating with the shaft and allowing the tactile pin to move linearly away from the shaft and linearly toward the shaft.

10. The system of claim 9, wherein the housing comprises a vault, the tactile pin positioned in the vault and free to move linearly within the vault.

11. The system of claim 9,
wherein the housing has an external surface with an aperture formed therein, the tactile pin aligned with the aperture,
wherein rotation of the shaft in the first rotational direction relative to the tactile pin causes the tactile pin to move linearly in the first linear direction away from the shaft and at least a portion of the tactile pin to extend through the aperture and beyond the external surface, and
wherein rotation of the shaft in the second rotational direction relative to the tactile pin causes the tactile pin to move linearly in the second linear direction toward the shaft and the tactile pin to become positioned below the external surface of the housing.

12. The system of claim 11,
further comprising a motor operably coupled with the shaft and adapted to cause the shaft to rotate in the first rotational direction and the second rotational direction.

13. The system of claim 12,
further comprising a motor mount, the motor positioned in the motor mount,
wherein the housing is fixed relative to the motor mount.

14. A tactile pin module, comprising:
an external surface having a plurality of apertures formed therein; and
a plurality of tactile pin systems, each tactile pin system corresponding to at least one of the plurality of apertures, and each tactile pin system comprising:
a tactile pin;
a recess having a first screw thread formed thereon, the recess rigidly coupled relative to the tactile pin;
a shaft coupled with a second screw thread, the second screw thread mechanically engaged with the first screw thread;
a projection extending from the shaft and secured relative to the shaft;
a first surface; and
a second surface,
wherein rotation of the shaft in a first rotational direction relative to the tactile pin causes the tactile pin to move linearly in a first linear direction away from the shaft, rotation of the shaft in the first rotational direction limited by the projection coming into contact with the first surface, and
wherein rotation of the shaft in a second rotational direction relative to the tactile pin causes the tactile pin to move linearly in a second linear direction toward the shaft, rotation of the shaft in the second rotational direction limited by the projection coming into contact with the second surface.

15. The tactile pin module of claim 14, wherein the first surface and second surface are rigidly coupled relative to the tactile pin.

16. The tactile pin module of claim 15, wherein movement linearly of the tactile pin in the first linear direction away from the shaft causes the first surface and the second surface to move linearly in the first linear direction and movement linearly of the tactile pin in the second linear direction toward the shaft causes the first surface and the second surface to move linearly in the second linear direction.

17. The tactile pin module of claim 14,
wherein rotation of the shaft causes the second screw thread to interface with the first screw thread resulting in movement of the tactile pin.

18. The tactile pin module of claim 14,
wherein rotation of the shaft in the first rotational direction relative to the tactile pin causes the tactile pin to move linearly in the first linear direction away from the shaft and at least a portion of the tactile pin to extend through one of the plurality of apertures and beyond the external surface, and wherein rotation of the shaft in the second rotational direction relative to the tactile pin causes the tactile pin to move linearly in the second linear direction toward the shaft and the tactile pin to become positioned below the external surface.

19. The tactile pin module of claim 18, each tactile pin system further comprising a motor operably coupled with the shaft and adapted to cause the shaft to rotate in the first rotational direction and the second rotational direction.

20. A braille display, comprising a body;

a retainer mechanically coupled to the body, the retainer adapted to form a frictional fit with an electronic computing device;

a first recess formed in the body, the first recess adapted to receive a plurality of tactile pin modules; and a plurality of tactile pin modules positioned in the first recess, each tactile pin module, comprising:

a tactile pin;

a shaft movably coupled to the tactile pin;

a projection secured relative to the shaft, the projection adapted to rotate with the shaft;

a first surface; and a second surface, wherein rotation of the shaft in a first rotational direction relative to the tactile pin causes the projection to rotate in the first rotational direction and the tactile pin to move linearly in a first linear direction away from the shaft, rotation of the shaft in the first rotational direction limited by the projection coming into contact with the first surface, and wherein rotation of the shaft in a second rotational direction relative to the tactile pin causes the projection to rotate in the second rotational direction and the tactile pin to move linearly in a second linear direction toward the shaft, rotation of the shaft in the second rotational direction limited by the projection coming into contact with the second surface.

\* \* \* \* \*